United States Patent
Kise et al.

(10) Patent No.: US 9,461,347 B2
(45) Date of Patent: Oct. 4, 2016

(54) POWER STORAGE DEVICE CELL, MANUFACTURING METHOD AND STORING METHOD THEREFOR, AND ELECTRIC STORAGE DEVICE

(75) Inventors: Makiko Kise, Tokyo (JP); Kenro Mitsuda, Tokyo (JP); Shigeru Aihara, Tokyo (JP); Daigo Takemura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 862 days.

(21) Appl. No.: 13/520,296

(22) PCT Filed: Jan. 12, 2011

(86) PCT No.: PCT/JP2011/050313
§ 371 (c)(1),
(2), (4) Date: Jul. 2, 2012

(87) PCT Pub. No.: WO2011/093126
PCT Pub. Date: Aug. 4, 2011

(65) Prior Publication Data
US 2012/0282495 A1    Nov. 8, 2012

(30) Foreign Application Priority Data

Jan. 28, 2010 (JP) ................ 2010-016587

(51) Int. Cl.
*H01M 12/00* (2006.01)
*H01M 6/50* (2006.01)
(Continued)

(52) U.S. Cl.
CPC ........... *H01M 12/005* (2013.01); *H01M 4/131* (2013.01); *H01M 4/133* (2013.01);
(Continued)

(58) Field of Classification Search
CPC ... H01M 12/00; H01M 12/005; H01M 12/02
USPC .................................................. 429/7
See application file for complete search history.

(56) References Cited

U.S. PATENT DOCUMENTS 6,682,850 B1 * 1/2004 Numata ............. H01M 4/131
429/209
2003/0194605 A1 * 10/2003 Fauteux et al. ............ 429/149
(Continued)

FOREIGN PATENT DOCUMENTS

| JP | 2001 351688 | 12/2001 |
| JP | 2006 40748 | 2/2006 |

(Continued)

OTHER PUBLICATIONS

International Search Report Issued Apr. 12, 2011 in PCT/JP11/50313 Filed Jan. 12, 2011.

(Continued)

*Primary Examiner* — Basia Ridley
*Assistant Examiner* — James Erwin
(74) *Attorney, Agent, or Firm* — Oblon, McClelland, Maier & Neustadt, L.L.P

(57) ABSTRACT

A power storage device cell is configured such that a capacitor positive electrode and a lithium positive electrode are directly connected with each other; a second electrode layer is formed of a material including particles of phosphoric-acid-type lithium compound having an olivine-type structure; the third electrode layers are formed mainly of particles of lithium titanate; and a third collector foil is formed of an aluminum foil.

1 Claim, 8 Drawing Sheets

(51) Int. Cl.
- *H01M 4/131* (2010.01)
- *H01M 4/133* (2010.01)
- *H01M 4/1391* (2010.01)
- *H01M 4/1393* (2010.01)
- *H01M 4/485* (2010.01)
- *H01M 4/587* (2010.01)
- *H01M 4/66* (2006.01)
- *H01M 4/70* (2006.01)
- *H01M 10/0525* (2010.01)
- *H01M 10/0585* (2010.01)
- *H01M 10/42* (2006.01)

(52) U.S. Cl.
CPC ......... *H01M4/1391* (2013.01); *H01M 4/1393* (2013.01); *H01M 4/485* (2013.01); *H01M 4/587* (2013.01); *H01M 4/661* (2013.01); *H01M 4/70* (2013.01); *H01M 6/5072* (2013.01); *H01M 10/0525* (2013.01); *H01M 10/0585* (2013.01); *H01M 10/4264* (2013.01); *H01M 12/00* (2013.01); *Y02E 60/122* (2013.01); *Y02P 70/54* (2015.11); *Y02T 10/7011* (2013.01); *Y10T 29/49115* (2015.01)

(56) References Cited

U.S. PATENT DOCUMENTS

| | | | |
|---|---|---|---|
| 2006/0014076 A1* | 1/2006 | Donoue et al. | 429/217 |
| 2007/0273332 A1 | 11/2007 | Funabashi et al. | |
| 2008/0048615 A1* | 2/2008 | Thackeray et al. | 320/128 |
| 2009/0029257 A1* | 1/2009 | Ando et al. | 429/231.95 |
| 2009/0148759 A1 | 6/2009 | Mitsuda et al. | |

FOREIGN PATENT DOCUMENTS

| | | |
|---|---|---|
| JP | 2006 190528 | 7/2006 |
| JP | 2006 278324 | 10/2006 |
| JP | 2007 273241 | 10/2007 |
| JP | 2008 282838 | 11/2008 |
| JP | 2009 141181 | 6/2009 |
| WO | 2011 092990 | 8/2011 |

OTHER PUBLICATIONS

U.S. Appl. No. 13/512,056, filed May 25, 2012, Aihara, et al.

* cited by examiner

POWER STORAGE DEVICE CELL, MANUFACTURING METHOD AND STORING METHOD THEREFOR, AND ELECTRIC STORAGE DEVICE

TECHNICAL FIELD

The present invention relates to the configuration of a power storage device cell incorporating a composition of a lithium ion capacitor and a composition of a lithium ion battery, a manufacturing method and a storing method therefor, and an electric storage device.

BACKGROUND ART

A capacitor that physically stores an electric charge and a secondary battery that stores energy through electrochemical reaction are among power storage device cells. A capacitor is characterized in that although its energy density is low, its output density is high and hence it can respond to rapid charging or discharging; a secondary battery is characterized in that although its instantaneous force is inferior to that of a capacitor, its energy density is high and hence its sustainability is superior to that of a capacitor. Accordingly, if there can be realized a power storage device cell that is provided with both the instantaneous force of a capacitor and the sustainability of a secondary battery, it can be utilized in various applications such as a hybrid automobile and various kinds of regenerative brakes.

As described above, a capacitor and a secondary battery are different from each other in terms of the mechanism for storing electric power; among capacitors, a capacitor utilizing an electrolyte (referred to as an electric double layer capacitor, a super capacitor, an electrochemical capacitor, or the like; a lithium ion capacitor is also among those capacitors) is provided with polarizable electrodes (a positive electrode and negative electrode) facing each other across a separator, stores electric charges by utilizing an electrostatic capacitance of electric double layers, which are formed on the surfaces of the polarizable electrodes in the electrolyte, and is formed of materials similar to those of a secondary battery.

Thus, the inventors of the present invention paid attention to a lithium ion battery, among secondary batteries, that has an especially high energy density, and proposed a new power storage device cell in which a lithium ion battery and a lithium ion capacitor, which works by sharing common electrolyte with the lithium ion battery, are configured into a single structure by use of a common negative electrode (e.g., refer to Patent Document 1). By means of the foregoing structure, a power storage device cell could be realized which has both the instantaneous force of an electric double layer capacitor and the sustainability of a lithium ion battery.

PRIOR ART REFERENCE

Patent Document

[Patent Document 1] Japanese Patent Application Laid-Open No. 2009-141181 (Paragraphs 0015 and 0068, FIGS. 1 and 12)

[Patent Document 2] Japanese Patent Application Laid-Open No. 2007-273241 (Paragraphs 0027 through 0032, FIGS. 1 and 4)

DISCLOSURE OF THE INVENTION

Problem to be Solved by the Invention

However, in the foregoing structure, as the collector foil of the common negative electrode, a copper foil is adopted which is utilized for the negative electrode of the lithium ion capacitor; thus, unlike an electric double layer capacitor, discharging that makes the voltage of the power storage device cell drop to 0 V is not allowed. Unless the inter-terminal voltage is kept to be the same as or higher than 1 V at least, elution of the copper is caused and irreversible deterioration occurs. Accordingly, it is required that when charging and discharging are being performed, not only the upper limit value of the inter-terminal voltage but also the lower limit value of the inter-terminal voltage is always monitored (for example, refer to Patent Document 2). Moreover, even when the power storage device cell is being stored, the deterioration is caused unless the inter-terminal voltage is kept to be the same as or higher than 1 V; thus, unlike an electric double layer capacitor, the power storage device cell cannot be stored with the positive electrode and the negative electrode directly connected with each other; therefore, because as is the case with a battery, it is necessary to store the power storage device cell under the condition that there exists a voltage across it, whereby the management is troublesome.

The present invention has been implemented in order to solve the foregoing problem; the objective thereof is to provide a power storage device cell in which the lower limit voltage is drastically lowered so that a low inter-terminal voltage of 0.1 V or lower can be obtained and hence the deterioration due to over discharge is coped with and that does not require the monitoring of the lower limit value of the inter-terminal voltage.

Means for Solving the Problems

A power storage device cell according to the present invention includes a first electrode in which a first electrode layer including activated-carbon fine particles is formed on one side of a first collector foil made of aluminum, a second electrode in which a second electrode layer is formed on one side of a second collector foil made of aluminum, a third electrode in which a third electrode layer is formed on at least one side of a third collector foil, a first separator formed of a porous insulative film, and a second separator formed of a porous insulative film; in the power storage device cell, penetration holes are formed in the third collector foil, a capacitor whose negative electrode is the third electrode is formed by inserting the first separator between the first electrode layer and one side of the third electrode, a lithium ion battery whose negative electrode common to the capacitor is the third electrode is formed by inserting the second separator between the second electrode layer and the other side of the third electrode, and the first electrode and the second electrode are directly connected; the power storage device cell is characterized in that the second electrode layer is formed of a material including particles of phosphoric-acid-type lithium compound having an olivine-type structure, and the third electrode layer is formed mainly of particles of lithium titanate.

Advantage of the Invention

There was found a phenomenon that in a power storage device in which a lithium battery and a capacitor are integrated through a common negative electrode, the potential characteristics of the lithium battery positive electrode change due to the effect of the capacitor positive electrode with which the lithium battery positive electrode is directly connected. By utilizing the phenomenon, there was found the combination of electrode materials, with which the lower limit of the inter-terminal voltage at the state of charge of 0% can be reduced to 0.1 V or lower, which cannot be realized by conventional respective materials for the lithium battery and the lithium ion capacitor. As a result, the problem of deterioration caused by over-discharge is solved, and the monitoring of the minimum voltage is no more required.

BRIEF DESCRIPTION OF THE DRAWINGS

FIG. 2 represents the relationship between the electric potential and the state of charge in the case where in the configuration of a conventional cell, cobalt-based metal oxide lithium is utilized for the positive electrode and graphite-based carbon is utilized for the negative electrode;

FIG. 3 represents the relationship between the electric potential and the state of charge in the case where in the configuration of a conventional cell, olivine-type lithium iron phosphate is utilized for the positive electrode and graphite-based carbon is utilized for the negative electrode;

FIG. 4 represents the relationship between the electric potential and the state of charge in the case where in the configuration of a conventional cell, cobalt-based metal oxide lithium is utilized for the positive electrode and lithium titanate is utilized for the negative electrode;

FIG. 3 represents the relationship between the electric potential and the state of charge in the case where in the configuration of a conventional cell, olivine-type lithium iron phosphate is utilized for the positive electrode and lithium titanate is utilized for the negative electrode;

FIG. 6 represents the relationship between the electric potential and the state of charge in the case where as the positive electrode for the power storage device cell according to Embodiment 1 of the present invention, there is utilized a hybrid positive electrode including a capacitor positive electrode formed mainly of particles of activated carbon and a lithium battery positive electrode formed mainly of particles of olivine-type lithium iron phosphate and there is utilized a common negative electrode formed mainly of particles of lithium titanate;

FIG. 7 represents the relationship between the electric potential and the state of charge in the case where lithium titanate for the power storage device cell according to Embodiment 1 of the present invention includes the crystal system that conforms to a general formula $Li_xTi_5O_{12}$ (4.0≤x≤4.1) at the state of charge of 0%;

BEST MODE FOR CARRYING OUT THE INVENTION

Embodiment 1

Figure 1:
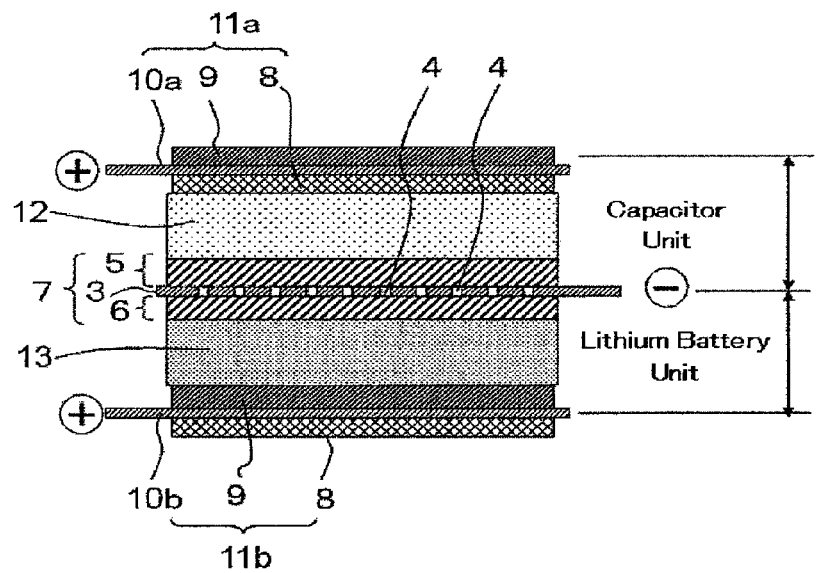
FIG. 1 is a partial cross-sectional view schematically illustrating a power storage device cell according to Embodiment 1 of the present invention.

FIG. 1 is a cross-sectional view illustrating the partial configuration of a power storage device cell according to Embodiment 1 of the present invention. In FIG. 1, the power storage device cell is provided with a capacitor positive electrode 11a in which a capacitor positive electrode layer 8 including activated-carbon fine particles is formed beneath an aluminum-made collector foil 10a in FIG. 1; a lithium positive electrode 11b in which a lithium positive electrode layer 9 including particles of olivine-type lithium iron phosphate, which is a kind of phosphoric-acid-type lithium compound having an olivine-type structure, is formed over an aluminum-made collector foil 10b in FIG. 1; a common negative electrode 7 in which a capacitor negative electrode layer 5 is formed over the upper side of an aluminum-made collector foil 3 having penetration holes 4 and a lithium negative electrode layer 6 is formed beneath the lower side of the collector foil 3; a first separator 12 formed of a porous insulative film; and a second separator 13 formed of a porous insulative film. In the power storage device cell, a capacitor unit is formed by inserting the first separator 12 between the capacitor positive electrode layer 8 and the capacitor negative electrode layer 5 of the common negative electrode 7, a lithium battery unit is formed by inserting the second separator 13 between the lithium positive electrode layer 9 and the lithium negative electrode layer 6 of the common negative electrode 7, and the capacitor positive electrode 11a and the lithium battery positive electrode 11b are directly connected.

In the power storage device cell configured as described above, the common negative electrode 7 is commonly utilized by the capacitor unit and the lithium battery unit, as the negative electrodes thereof, and the capacitor positive electrode 11a and the lithium positive electrode 11b are directly connected with each other. Accordingly, when charging and discharging are implemented, lithium ions can rapidly move between the capacitor unit and the lithium battery unit, through the penetration holes 4 provided in the common negative electrode 7; thus, the capacitor unit can also participate in the charging and discharging, whereby rapid charging and discharging can be realized.

<Basic Structure of Power Storage Device Cell>

In FIG. 1, the common negative electrode 7 is configured by forming the capacitor negative electrode layer 5 and the lithium battery negative electrode layer 6, which are made mainly of lithium titanate, on the upper side and the lower side, respectively, of the aluminum-made negative electrode collector foil 3, in which a plurality of penetration holes that distributed in-plane are provided. The positive electrode is configured as a hybrid positive electrode 11 in which the capacitor positive electrode layer 8 including activated-carbon particles and the lithium battery positive electrode layer 9 including olivine-type lithium iron phosphate particles are formed on the lower side and the upper side, respectively, of a positive electrode collector foil 10. The capacitor unit is configured by inserting the first separator 12 between the capacitor positive electrode layer 8 and the capacitor negative electrode layer 5; the lithium ion battery unit is configured by inserting the second separator 13 between the lithium ion battery positive electrode layer 9 and the lithium battery negative electrode layer 6. In other words, in FIG. 1, the hybrid positive electrodes 11 having the same specification, in which the capacitor positive electrode layer 8 is formed on the one side of the collector foil 10 and the lithium battery positive electrode layer 9 is formed on the other side thereof, play different roles by being differently disposed (due to the difference in the side to be utilized), i.e., the hybrid positive electrodes 11a and 11b function as the capacitor positive electrode and the lithium battery positive electrode, respectively.

The capacitor positive electrode in which the capacitor positive electrode layer 8 is provided on the one side of (beneath) the strip-shaped positive electrode collector foil 10a, the first separator 12, the common negative electrode 7, the second separator 13, and the lithium battery positive electrode in which the lithium battery positive electrode layer 9 is provided on the other side of (over) the positive electrode collector foil 10b are laminated on that order, and then the capacitor positive electrode and the lithium battery positive electrode are directly connected, so that a power storage device cell having a simplest laminate shape can be configured.

The strip-shaped common negative electrode 7, the first separator 12, the hybrid positive electrode 11, and the second separator 13 are alternately laminated so that a so-called laminate-type electric storage device is configured which has a main laminate unit in which a great number of positive electrodes and negative electrodes are laminated in parallel with one another. In the case of a parallel laminate type, it is desirable to arrange the common negative electrodes 7 at both outmost layers. In the case where the hybrid positive electrode 11 is disposed at the outmost layer, the capacitor positive electrode layer 8 or the lithium battery positive electrode layer 9 may have a high electric potential and hence be deteriorated. Moreover, in the case of a parallel laminate type, as both outmost layers, a capacitor negative electrode in which the capacitor negative electrode layer 5 is provided on one side of a strip-shaped negative electrode collector foil and a lithium battery negative electrode in which the lithium battery negative electrode layer 6 is provided on one side of a negative electrode collector foil can be utilized. In this case, a negative electrode collector foil having no penetration hole may be utilized. Alternatively, as both outmost layers, a capacitor positive electrode in which the capacitor positive electrode layer 8 is provided on one side of a strip-shaped positive electrode collector foil and a lithium battery positive electrode in which the lithium battery positive electrode layer 9 is provided on one side of a positive electrode collector foil can be utilized.

A winding-type or flat-winding-type electric storage device is configured by winding a roll-shaped common negative electrode 7, the first separator 12, the hybrid positive electrode 11, and the second separator 13 together. In this case, it is desirable to dispose at the outmost layer the first separator 12 in contact with the common negative electrode 7. When the second separator 13 in contact with the hybrid positive electrode 11 is disposed at the outmost layer, the capacitor positive electrode layer 8 or the lithium battery positive electrode layer 9 may have a high electric potential and hence be deteriorated.

<Constituent Materials>

The capacitor negative electrode layer 5 and the lithium battery negative electrode layer 6 are formed of a material in which a lithium titanate particle, as the main component, is mixed with a binder such as PVDF and a conductive assistant such as acetylene black. It is desirable that the lithium titanate particle is a fine particle having a diameter of 1 μm or smaller; it may be mixed with a carbon fiber for the purpose of improving the conductivity. Alternatively, a carbon fiber such as a carbon nanotube or a carbon nanohorn may carry a lithium titanate ultra-fine particle having a diameter of approximately several nanometers.

The capacitor positive electrode layer 8 is formed by mixing a particle, as the main component, that has an average particle diameter of approximately 1 to 10 μm and is obtained by applying steam activation or alkali activation to phenol resin, petroleum pitch, petroleum coke, coconut carbon, or the like, with a Styrene-butylene-rubber-based binder or a polytetrafluoroethylene-based binder and a conductive assistant such as acetylene black. Instead of an activated carbon, a carbon particle referred to as a nano-gate carbon or a nano-storage carbon may be utilized.

The lithium battery positive electrode layer 9 is formed, for example, by mixing a particle, as the main component, that is obtained by making a carbon ultra-fine particle adhere to a particle of a lithium iron phosphate compound having an olivine-type structure, for the purpose of improving the conductivity, with a binder such as PVDF and a conductive assistant such as acetylene black. As the lithium iron phosphate compound having an olivine-type structure, instead of the foregoing lithium iron phosphate, a compound may be utilized in which part of irons of the lithium iron phosphate are replaced by at least one kind of transition metal element such as manganese or cobalt. By utilizing the foregoing compounds, the electric potential vs. lithium can be lowered to 2 V or lower when discharging is implemented; thus, in the case where lithium titanate is utilized in the negative electrode, the discharge voltage can be lowered to 0.1 V or lower.

As the negative electrode collector foil 3, there may be utilized a punching metal aluminum foil or an expanded metal aluminum foil, in which the penetration holes 4 are preliminarily formed so as to distribute in-plane and the thickness of which is from 10 μm to 20 μm, or an etching foil in which, by use of a mask, a great number of holes are formed through chemical etching. Such a negative electrode collector foil can be utilized with the capacitor negative electrode layer 5 and the lithium battery negative electrode layer 6 formed on the respective sides thereof. As the positive electrode collector foil 10, an aluminum foil having a thickness of from 7 μm to 50 μm can be utilized.

As the electrolyte solution, for example, an electrolyte solution obtained by making $LiPF_6$, which is an electrolyte, to be contained in an organic solvent can be utilized; the electrolyte solution is commonly utilized in both the capacitor unit and the lithium battery unit. As the organic solvent, for example, a propylene carbonate (PC), an ethylene carbonate (EC), a diethyl carbonate (DEC), or the like can be utilized.

As each of the first separator 12 and the second separator 13, for example, there can be utilized an insulative film made of cellulose, polyethylene, or polypropylene having a thickness of approximately 10 to 50 μm, a pore rate (porosity) of approximately 60% to 80% by volume, and an average pore diameter of approximately several to several dozen micrometers.

<Mechanism of Lower Limit Voltage>

Figure 2:
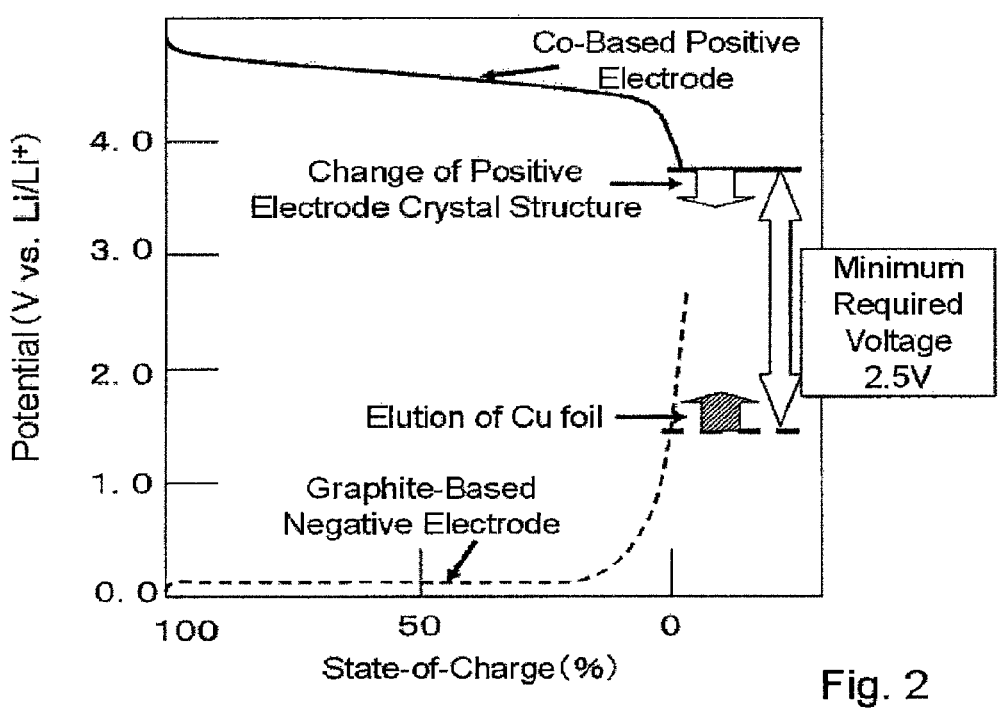
FIG. 2 is a graph for explaining the effect of the present invention.

The reason why the lower limit voltage exists in a conventional lithium battery will be explained with reference to FIGS. 2 through 5. FIG. 2 is a graph representing the relationship between the electric potential and the state of charge in the case where cobalt-based metal oxide lithium is utilized for the positive electrode and graphite-based carbon is utilized for the negative electrode. In general, the state of charge is referred to as a "SOC"; it is an index for defining the states of charge of 0% through 100%, assuming that the chargeable or dischargeable electric quantity is 100%.

In FIG. 2, when due to over-discharge, the state of charge becomes approximately 0%, the negative electrode potential (the broken line) rises and the positive electrode potential (the solid line) falls. When the negative electrode potential rises, elution of the copper foil utilized as the negative electrode gradually begins, and hence irreversible and rapid deterioration is caused. Moreover, when the positive electrode potential excessively falls, the crystal structure of the cobalt-based metal oxide lithium largely changes and a physical change is also caused, whereby some portions that cannot come around are formed, resulting in irreversible deterioration. Therefore, in the case where cobalt-based metal oxide lithium is utilized for the positive electrode and graphite-based carbon is utilized for the negative electrode, it is required to set a minimum voltage, as explained in "Background Art", and to constantly monitor the lower limit voltage so that an alarm is rung when the inter-terminal voltage becomes the same as or lower than the minimum voltage. In that situation, the minimum required voltage is approximately 2.5 V; in the case where the inter-terminal voltage becomes much lower than this minimum required voltage, for example, when due to external short-circuiting or the like, the inter-terminal voltage becomes the same as or lower than 1 V, such an extremely large deterioration as the copper foil is eluted is caused, whereby the battery itself needs to be replaced.

Figure 3:
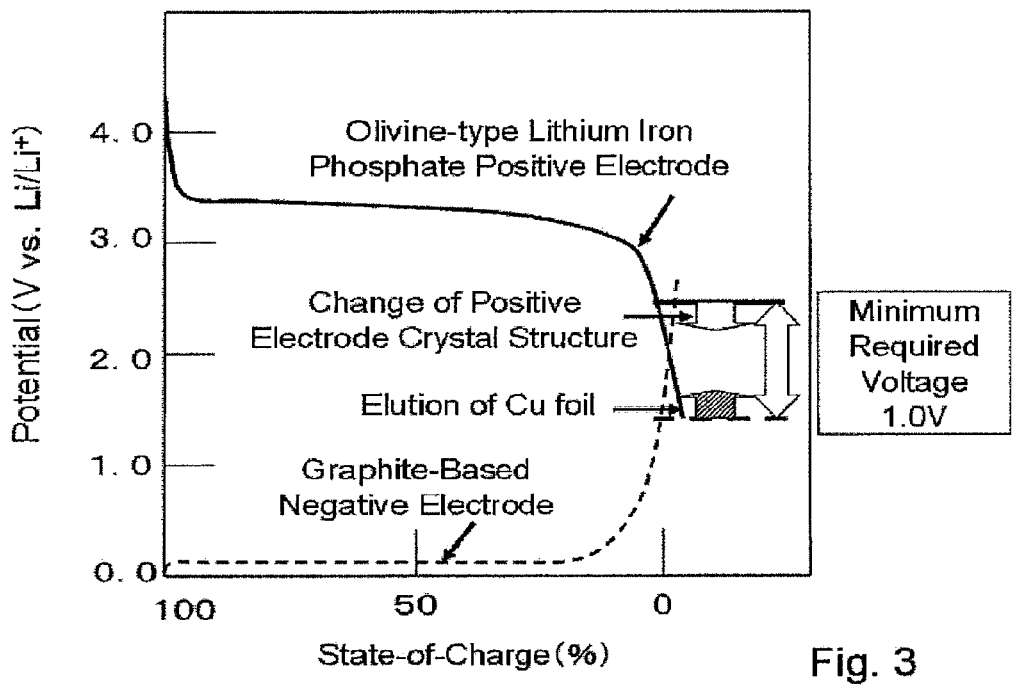
FIG. 3 is a graph for explaining the effect of the present invention.

FIG. 3 is a graph representing the relationship between the electric potential and the state of charge in the case where olivine-type lithium iron phosphate is utilized for the positive electrode and graphite-based carbon is utilized for the negative electrode; the material for the positive electrode is different from that in the system in FIG. 2. Also in FIG. 3, when due to over-discharge, the state of charge becomes approximately 0%, the negative electrode potential rises and the positive electrode potential falls. When the negative electrode potential rises, elution of the copper foil gradually begins, and hence irreversible and rapid deterioration is caused. In the case where the positive electrode potential falls excessively, the crystal structure of olivine-type lithium iron phosphate changes, resulting in irreversible deterioration. Therefore, also in the case where olivine-type lithium iron phosphate is utilized for the positive electrode and graphite-based carbon is utilized for the negative electrode, there exists a minimum voltage; thus, it is required to constantly monitor the lower limit voltage so that an alarm is rung when the inter-terminal voltage becomes the same as or lower than the minimum voltage. In that situation, the minimum required voltage is approximately 1 V, i.e., smaller that when a cobalt-based material is utilized; also in this case, for example, when due to external short-circuiting or the like, the inter-terminal voltage becomes the same as or lower than 0.5 V, such an extremely large deterioration as the copper foil is eluted is caused, whereby the battery itself needs to be replaced.

Figure 4:
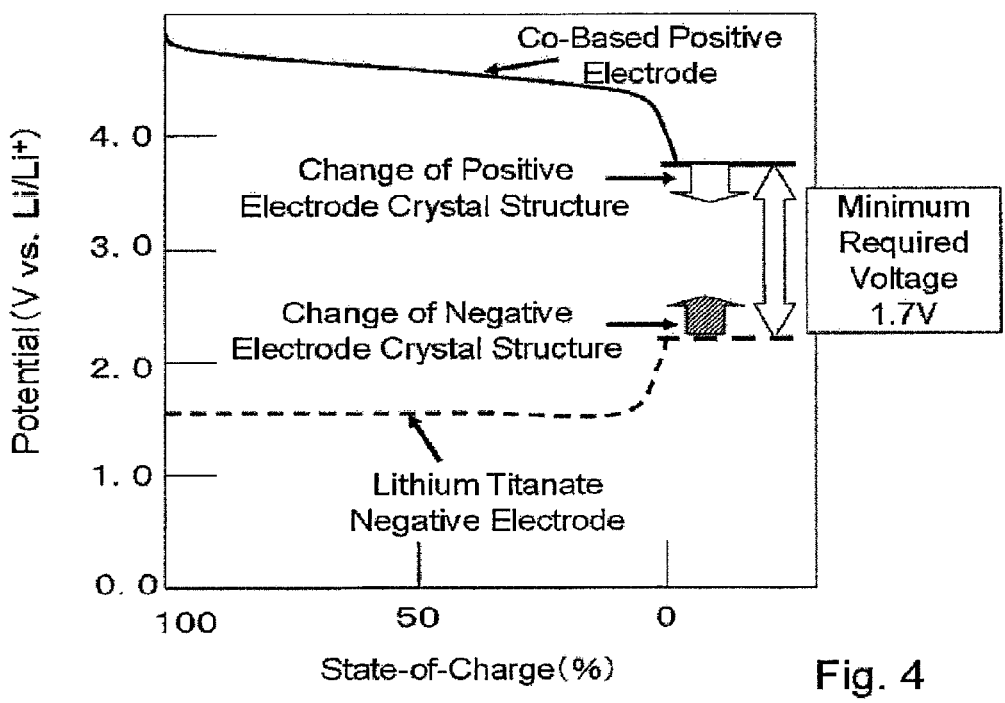
FIG. 4 is a graph for explaining the effect of the present invention.

FIG. 4 is a graph representing the relationship between the electric potential and the state of charge in the case where cobalt-based metal oxide lithium is utilized for the positive electrode and lithium titanate is utilized for the negative electrode; the material for the negative electrode is different from that in the system in FIG. 2. Also in FIG. 4, when due to over-discharge, the state of charge becomes approximately 0%, the negative electrode potential rises and the positive electrode potential falls. In the case where lithium titanate is utilized, the negative electrode potential becomes 1 V or higher; thus, instead of a copper foil, an aluminum foil can be utilized as the negative electrode collector foil. Unlike copper, aluminum is eluted at a low electric potential of 1 V or lower, but is not eluted at a high electric potential; thus, unlike copper, aluminum is not eluted even when the negative electrode potential rises. However, when lithium is excessively extracted from lithium titanate, the electric potential rises and hence the crystal system changes; thus, an excessive rise in the electric potential causes deterioration. In the case where the positive electrode potential falls excessively, the crystal structure of cobalt-based metal oxide lithium changes, resulting in irreversible deterioration. Therefore, also in the case where cobalt-based metal oxide lithium is utilized for the positive electrode and lithium titanate is utilized for the negative electrode, there exists a minimum voltage; thus, it is required to constantly monitor the lower limit voltage so that an alarm is rung when the inter-terminal voltage becomes the same as or lower than the minimum voltage. The minimum required voltage is approximately 1.7 V. In the case where the inter-terminal voltage becomes much lower than this minimum required voltage, for example, when due to external short-circuiting or the like, the inter-terminal voltage becomes the same as or lower than 1 V, conspicuous deterioration is caused mainly by a change in the crystal system of cobalt-based metal oxide lithium.

Figure 5:
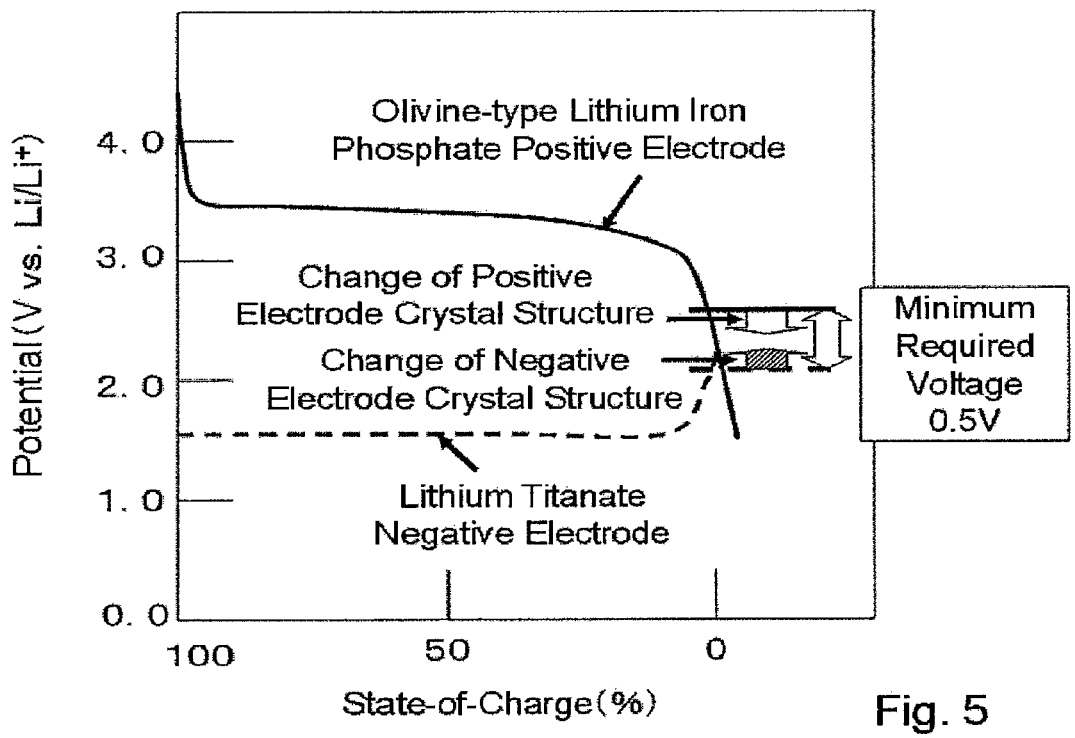
FIG. 5 is a graph for explaining the effect of the present invention.

FIG. 5 is a graph representing the relationship between the electric potential and the state of charge in the case where olivine-type lithium iron phosphate is utilized for the positive electrode and lithium titanate is utilized for the negative electrode; both the materials for the positive electrode and the negative electrode are different from the respective materials for the system in FIG. 2. Also in FIG. 5, when due to over-discharge, the state of charge becomes approximately 0%, the negative electrode potential rises and the positive electrode potential falls. In the case where lithium titanate is utilized, an aluminum foil, instead of a copper foil, can be utilized as the negative electrode collector foil; thus, even when the negative electrode potential rises, no elution of copper is caused. However, when lithium is excessively extracted from lithium titanate, the electric potential rises and hence the crystal system changes; thus, an excessive rise in the electric potential causes deterioration. In the case where the positive electrode potential falls excessively, the crystal structure of olivine-type lithium iron phosphate changes, resulting in irreversible deterioration. Therefore, also in the case where olivine-type lithium iron phosphate is utilized for the positive electrode and lithium titanate is utilized for the negative electrode and when due to external short-circuiting or the like, the inter-terminal voltage falls to approximately 0 V, conspicuous deterioration is caused by a change in the crystal system of the olivine-type lithium iron phosphate or the lithium titanate.

In other words, it was learned that it is difficult to lower the inter-terminal voltage to approximately 0 V only by combining materials that can be utilized as the materials of a lithium battery. However, there was found a phenomenon that in a power storage device in which a lithium battery and a capacitor are integrated through a common negative electrode, the potential characteristics of the positive electrode of the lithium battery that is directly connected with the positive electrode of the capacitor change from the potential characteristics thereof at a time when the lithium battery is separated from the capacitor. As described below, in a power storage device cell according to Embodiment 1 of the present invention, the lower limit of the inter-terminal voltage can be lowered to 0.1 V or lower at the state of charge of 0%, by taking advantage of the phenomenon.

Figure 6:
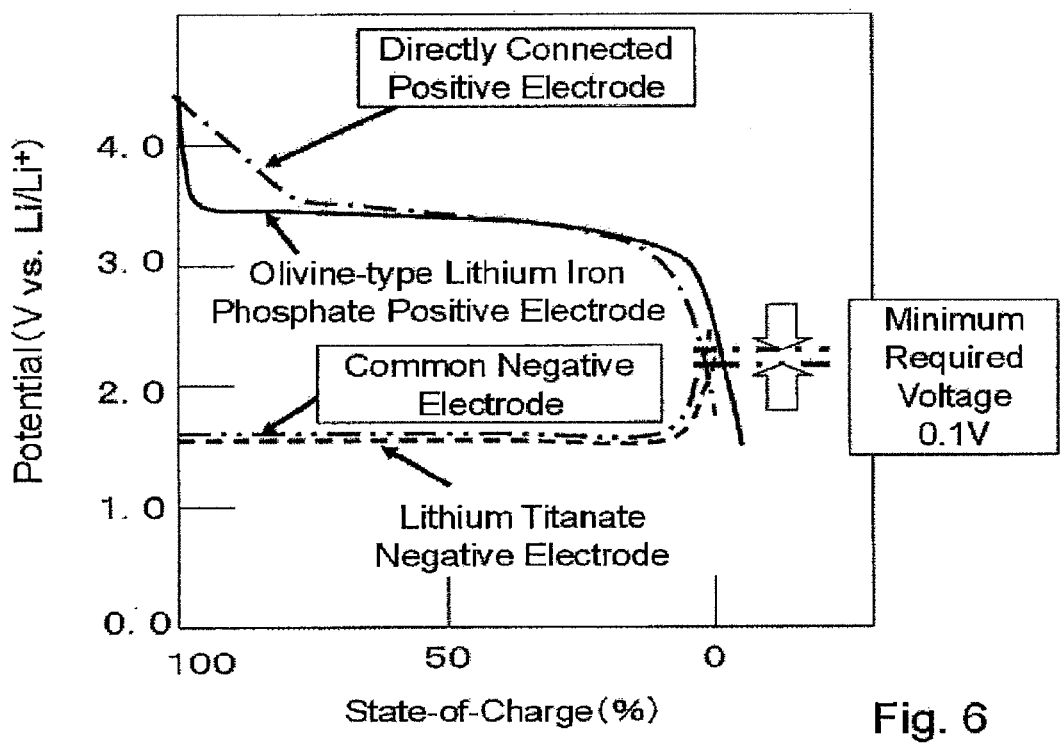
FIG. 6 is a graph for explaining the effect of the present invention.
Figure 7:
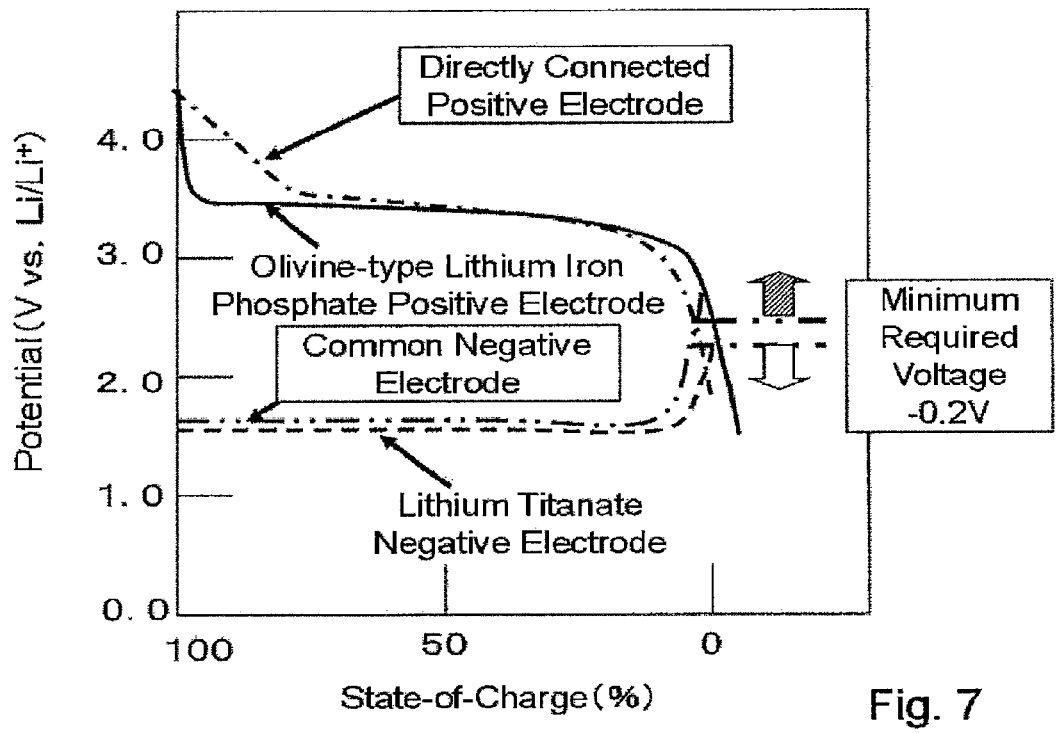
FIG. 7 is a graph for explaining the effect of the present invention.

Each of FIGS. 6 and 7 is a potential chart for the lithium battery unit of a power storage device cell according to Embodiment 1 of the present invention. FIG. 6 is a graph representing the relationship between the electric potential and the state of charge in the case where as the positive electrode, there is utilized a hybrid positive electrode including a capacitor positive electrode formed mainly of particles of activated carbon and a lithium battery positive electrode formed mainly of particles of olivine-type lithium iron phosphate and there is utilized a common negative electrode formed mainly of particles of lithium titanate. As is the case with the system in FIG. 5, olivine-type lithium iron phosphate and lithium titanate are utilized for the positive electrode and the negative electrode, respectively; however, because the respective positive electrodes of the capacitor unit and the lithium battery unit are directly connected with each other, the potential chart becomes a curve different from that of FIG. 5, due to a large effect of the capacitor unit. The electric potential (the dashed line) of the hybrid positive electrode largely differs in the region where the state of charge is 90% through 100%; in this region, due to the effect of the capacitor unit, the electric potential falls from 4.3 V to 3.5 V at a constant gradient. This region is based on discharge from the capacitor unit. Similarly, the region where the state of charge is from 10% to 0% is also based on discharge from the capacitor unit; thus, a gradient is caused. Accordingly, the electric potential largely falls compared with the case (the solid line) where only olivine-type lithium iron phosphate is utilized. Meanwhile, due to the effect of the capacitor unit, the electric potential (the double-dashed line) steeply rises compared with the case (the broken line) where only lithium titanate is utilized. Accordingly, the inter-terminal voltage at the state of charge of 0% is lower than 0.1 V. When the inter-terminal voltage becomes lower than 0.1 V, it becomes substantially difficult to obtain a current, because of the existence of an internal resistance; thus, no deterioration is caused by over-discharge. Therefore, the constant monitoring of the minimum voltage is not required.

As is the case with FIG. 6, FIG. 7 is a graph representing the relationship between the electric potential and the state of charge in the case where as the positive electrode, there is utilized a hybrid positive electrode including a capacitor positive electrode formed mainly of particles of activated carbon and a lithium battery positive electrode formed mainly of particles of olivine-type lithium iron phosphate and there is utilized a common negative electrode formed mainly of particles of lithium titanate. FIG. 7 differs from FIG. 6 in that adjustment is performed in such a way that the composition of lithium titanate, which is an electrode material of the common negative electrode 7, includes the crystal system of general formula $Li_xTi_5O_{12}$ (4.0≤x≤4.1) at the state of charge of 0%.

In the case of the crystal system in which the general formula $Li_xTi_5O_{12}$ (4.0≤x≤4.1) is satisfied at the state of charge of 0%, lithium is insufficient when the state of charge is 0%; thus, the negative electrode potential largely rises. Accordingly, when the state of charge is 0%, the inter-terminal voltage reaches 0 V. It is when the inter-terminal voltage reverses to reach −0.2 V that deterioration is caused; because in general, no discharging leads to a negative voltage, the inter-terminal voltage stabilizes at 0 V.

The crystal system in which the general formula $Li_xTi_5O_{12}$ (4.0≤x≤4.1) is satisfied can be realized by designing the total amount of lithium titanate and the total amount of lithium ions in such a way that lithium titanate is insufficient when the state of charge is 0%. Lithium titanate can absorb lithium until the general formula $Li_xTi_5O_{12}$ (x=7) is satisfied. When discharging has been performed to the extent that the general formula $Li_xTi_5O_{12}$ (x=4.1) is satisfied and when the olivine-type lithium iron phosphate can absorb lithium and the capacitor positive electrode can absorb lithium ions, the electrolyte solution still has room to accept lithium ions; thus, lithium ions are further released from the lithium titanate, and then the crystal system is formed in which the general formula $Li_xTi_5O_{12}$ (4.0≤x≤4.1) is satisfied. For example, by setting the initial amount of lithium ions in the electrolyte solution at low level, the crystal system can be formed in which the general formula $Li_xTi_5O_{12}$ (4.0≤x≤4.1) is satisfied at the state of charge of 0%; therefore, the inter-terminal voltage can become 0 V at the state of charge of 0%.

As is the case with an electric double layer capacitor, when the inter-terminal voltage becomes 0 V, the positive electrode and the negative electrode are electrically connected with each other by use of a metal wire or the like, so that the power storage device can safely be taken out, transported, and removed. Moreover, because no potential difference exists and no deterioration is caused, there is demonstrated an effect that the durability to high temperature is raised. In other words, a power storage device cell and an electric storage device according to Embodiment 1 of the present invention can safely be stored by directly connecting the common negative electrode with the positive electrode in which the lithium battery positive electrode and the capacitor positive electrode are directly connected with each other.

In the case where power storage devices are connected in series with one another, the inter-terminal voltages of part of the power storage device cells may become a negative voltage at the end stage of discharge. In the case where as represented in FIG. 7, adjustment is performed in such a way that the general formula $Li_xTi_5O_{12}$ (4.0≤x≤4.1) is satisfied at the state of charge of 0%, it may be allowed that the inter-terminal voltage becomes a negative voltage; therefore, the deterioration caused by over-discharge can drastically be improved.

Next, in order to verify the performance of a power storage device cell according to Embodiment 1 of the present invention, prototype cells having different structures of the common negative electrode were manufactured and performance tests were carried out. In the foregoing performance tests, in order to simplify the test condition, a positive electrode dedicated to a lithium battery positive electrode and a positive electrode dedicated to a capacitor positive electrode were utilized instead of a hybrid electrode.

EXAMPLE 1

[Manufacturing of Common Negative Electrode]

Particles of lithium titanate according to the general formula $Li_xTi_5O_{12}$ (x=4.0), acetylene black, as a conductive assistant, and polyvinylidene fluoride (PVDF), as a binder, were mixed at the weight ratio of 87:5:8, so that an electrode paste including n-methylpyrrolidone, as a solvent, was mixture-prepared. Next, both sides of an aluminum foil, as the negative electrode collector foil 3, the width and the thickness of which are 300 mm and 20 µm, respectively, and in which holes (penetration holes 4) having a diameter of 1 mm have been punched in steps of 5 mm, were coated with this paste and dried; then, the aluminum foil was hot-pressed at 150° C. to be adopted as the common negative electrode. The negative electrode was cut into a strip of 32 mm by 52 mm; a portion of 20 mm by 20 mm was cut out from the corner thereof; then, a tab of 7 mm by 20 mm was provided so as to be utilized as a current terminal tab.

[Manufacturing of Capacitor Positive Electrode]

As the capacitor positive electrode layer, an electrode paste consisting of activated-carbon having an average particle diameter of 5 µm, acrylic-based polymer, as a binder, and water, as a solvent, was mixture-prepared. Next, one side of a pure-aluminum collector foil 10C having a thickness of 50 µm and a width of 300 mm was coated with this paste so that the capacitor positive electrode layer 8 having a thickness of 100 µm was formed; then, a capacitor positive electrode 11C was obtained. The positive electrode 11C was cut into a strip of 30 mm by 50 mm; a portion of 23 mm by 20 mm was cut out from the corner thereof; then, a tab of 7 mm by 20 mm was provided, and then the capacitor positive electrode layer 8 corresponding to the tab was peeled off, so that the foil portion was exposed so as to be utilized as a current terminal tab.

[Manufacturing of Lithium Battery Positive Electrode]

As the lithium battery positive electrode layer, olivine-type lithium iron phosphate having an average particle diameter 5 µm, acetylene black, polyvinylidene fluoride (PVDF), as a binder, were dispersed into n-methylpyrrolidone (NMP) was coated on the lower side of a pure-aluminum collector foil 10L, having a thickness of 50 µm, and dried at 100° C. so as to form the lithium battery positive electrode layer 9 having a thickness of 100 µm; then, the lithium battery positive electrode layer 9 was pressed with a hot roll at 150° C. so that a lithium battery positive electrode 11L was obtained. The positive electrode 11L was cut into a strip of 30 mm by 50 mm; a portion of 23 mm by 20 mm was cut out from the corner thereof; then, a tab of 7 mm by 20 mm was provided, and then the lithium battery positive electrode layer 9 corresponding to the tab was peeled off, so that the foil portion was exposed so as to be utilized as a current terminal tab.

[Manufacturing of Cell]

Figure 8:
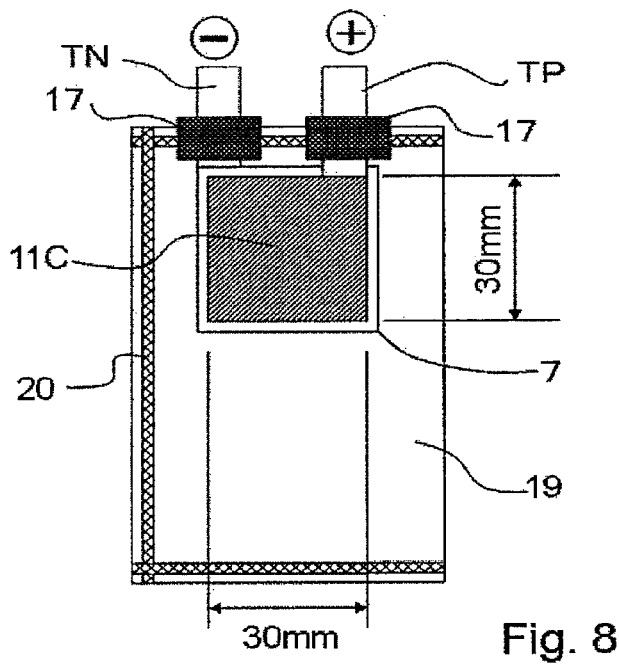
FIG. 8 is a plan view illustrating a performance testing cell for a power storage device according to Embodiment 1 of the present invention.

The capacitor positive electrode 11C (only one side, i.e., only the electrode layer 8 is formed), the common negative electrode 7, and the lithium battery positive electrode 11L (only one side, i.e., only the electrode layer 9 is formed) were laminated in that order in such a way that the centers thereof are aligned with one another and the electrode layers thereof face one another; respective cellulose-based separators having a thickness of 35 µm were inserted between the corresponding electrode layers. The collector tabs of two positive electrodes 11C and 11L were superimposed on each other, and then these collector tabs were directly connected by an aluminum foil ultrasound-welded thereon, so that a positive electrode collector terminal TP was formed. As illustrated in FIG. 8, this electrode laminated body is contained in an aluminum-laminate-film case 19; as the electrolyte solution, a mixed solvent of ethylene carbonate and diethyl carbonate (3:7) including $LiPF_6$ of 1.5 mol/l was put into the package; at last, the aluminum-laminate case 19 was sealed, so that a testing cell was obtained. FIG. 8 is a semi-transparent view of the testing cell to which the aluminum-laminate-film case was applied. In the figure, the aluminum-laminate-film case 19 is folded into half, and heat fusing 20 with thermoplastic resin is applied to the three sides thereof. Thermoplastic resins 17 having improved adhesiveness to metal are mounted on the current terminals TP and TN and then are heat-fused with the case. Through vacuum drawing, the bottom side in FIG. 8 was impregnated with the electrolyte solution; finally, heat fusing was applied to the bottom side so as to seal it. The reason why in FIG. 8, the case 19 is made longer than the electrode is that even in the case where when a contact pressure is applied to the electrode of 3 cm by 3 cm and a charging/discharging test is implemented, the electrode generates gas due to deterioration thereof, the generated gas is stored in the elongated case portion so that the test can be continued. In order to prevent a deviation between the positive electrode and the negative electrode from causing a measurement error, the exterior four sides of the negative electrode 7 are 1 mm longer than the respective four sides of the positive electrodes 11C and 11L.

[Evaluation of Cell]

While by use of a stainless-steel retaining plate, a contact pressure of 5 $Kg/cm^2$ was applied to the electrode of 3 cm by 3 cm in the cell, a charging/discharging test was implemented in which 20-minute charging and 20-minute discharging (3C) were alternatively repeated for 48 hours under the conditions of the ambient temperature of 5° C., the lower limit voltage of 0 V, and the upper limit voltage of 4.0 V. Before and after the test, charging and discharging were repeated three times, and then the electrostatic capacitance was determined from the discharging curve of the third charging and discharging. Defining the initial electrostatic capacitance as 100%, the post-testing electrostatic capacitance maintenance rate was determined.

EXAMPLE 2

Example 2 is the same as Example 1 except that as the electrolyte solution, there is utilized a solvent including $LiPF_6$ of 1.2 mol/l, and ethylene carbonate and diethyl carbonate that are mixed with each other at the mixing rate of 3:7.

COMPARATIVE EXAMPLE 1

Comparative Example 1 is the same as Example 1 except that it is manufactured in such a way that the capacitor negative electrode layer 5 and the lithium negative electrode layer 6 are formed mainly of graphite-based carbon particles and the common-negative-electrode collector foil 3 is formed of not an aluminum foil but a copper foil in which through-holes are punched out.

COMPARATIVE EXAMPLE 2

Comparative Example 2 is the same as Example 1 except that the lithium negative electrode layer 6 is formed by use of lithium cobalt oxide fine particles.

The results of evaluations on Examples 1 and 2 and Comparative Examples 1 and 2 are represented in Table 1.

TABLE 1

| | Hybrid Positive Electrode | | Common Negative Electrode | | | Concentration of Electrolyte Solution | Electrostatic Capacitance Maintenance Rate |
|---|---|---|---|---|---|---|---|
| | Capacitor Unit | Lithium Battery Unit | Capacitor Unit | Lithium Battery Unit | Collector Foil | | |
| Example 1 | Activated Carbon | Olivine-type Lithium Iron Phosphate | Lithium Titanate | Lithium Titanate | Aluminum | 1.5 mol/l | 90% |
| Example 2 | Activated Carbon | Olivine-type Lithium Iron Phosphate | Lithium Titanate | Lithium Titanate | Aluminum | 1.2 mol/l | 98% |
| Compar. Example 1 | Activated Carbon | Olivine-type Lithium Iron Phosphate | Graphite based Carbon | Graphite based Carbon | Copper | 1.5 mol/l | 15% |
| Compar. Example 2 | Activated Carbon | Lithium Cobalt Oxide | Lithium Titanate | Lithium Titanate | Aluminum | 1.5 mol/l | 26% |

In Table 1, comparing Examples 1 and 2 with Comparative Examples 1 and 2, it was learned that in each of Examples 1 and 2, the electrostatic capacitance maintenance rate was kept at a high value, which is 90% of the initial value or higher, but in each of Comparative Examples 1 and 2, the electrostatic capacitance maintenance rate fell to a value that is one-third of the initial value or lower. After disassembling and examining Comparative Examples 1 and 2, it was found that in Comparative Example 1, clear elution was found at the copper foil, and the electrolyte solution was colored. In Comparative Example 2, a great number of cracks were caused in the lithium battery positive electrode layer; as a side reaction, there was generated a gas, which would have been caused by decomposition of the electrolyte solution, and the aluminum-laminated container, which is a case, inflated.

Comparing Example 1 with Example 2, the electrostatic capacitance maintenance rate of Example 2 was kept at a higher value than the value at which the electrostatic capacitance maintenance rate of Example 1 was kept; thus, it is clear that the stability of Example 2 is more improved than that of Example 1.

The cell of Example 2 was further stored at a room temperature for one month under the condition that the positive electrode and the negative electrode thereof were electrically connected with each other by use of a clip; then, after charging and discharging were implemented three times, the electrostatic capacitance was examined. Because the electrostatic capacitance maintenance rate has been kept at a high value of 96% and the internal resistance had not become high, it was clear that the cell can be stored under that condition that the positive electrode and the negative electrode thereof are electrically connected with each other.

With regard to foregoing Examples and Comparative Examples, a case was described in which because of the test utilizing a small cell, the dedicated capacitor positive electrode 11C and lithium battery positive electrode 11L were formed by providing the positive electrode on one side of respective positive electrode collector foils; however, it is obvious that the same effect can be obtained also with a configuration in which as illustrated in FIG. 1, alternate lamination is made through the separators, by use of the hybrid positive electrode 11 including the positive electrode layers 8 and 9 provided on both the corresponding sides of the positive electrode collector foil 10. It is also obvious that wound or flatly wound long cell can demonstrate the same effect.

As described above, a power storage device cell according to Embodiment 1 of the present invention is provided with a first electrode (capacitor positive electrode) 11a in which a capacitor positive electrode layer 8, which is a first electrode layer and includes activated-carbon fine particles, is formed on one side of an aluminum-made first collector foil 10a; a second electrode (lithium positive electrode) 11b in which a lithium battery positive electrode layer 9, which is a second electrode layer, is formed on one side of an aluminum-made second collector foil 10b; a third electrode 7 in which a third electrode layer 5 or a third electrode layer 6 is (are) formed on at least one side of a third collector foil 3; a first separator 12 formed of a porous insulative film; and a second separator 13 formed of a porous insulative film. In the power storage device cell, a penetration hole 4 is formed in the third collector foil 3; a capacitor whose negative electrode is the third electrode 7 is formed by inserting the first separator 12 between the first electrode layer 8 and the third electrode layer 5; a lithium ion battery whose negative electrode common to the capacitor is the third electrode 7 is formed by inserting the second separator 13 between the second electrode layer 9 and the electrode layer 6 of the third electrode 7; and the first electrode 10a and the second electrode 10b are directly connected. The second electrode layer 9 is formed of a material including particles of olivine-type lithium iron phosphate, the third electrode layers 5 and 6 are formed mainly of particles of lithium titanate, and the third collector foil 3 is formed of an aluminum foil; therefore, there can be obtained a power storage device cell in which a low inter-terminal voltage of 0.1 V or lower can be allowed at a time when discharging is implemented and hence the deterioration due to over discharge is coped with and that does not require the monitoring of the lower limit value of the inter-terminal voltage.

In particular, the cell is configured in such a way that the composition of lithium titanate conforms to the general formula $Li_xTi_5O_{12}$ (4.0≤x≤4.1) when the state of charge of the power storage device cell is 0%; therefore, no deterioration is caused even when the inter-terminal voltage becomes completely 0 V.

In a storing method, according to Embodiment 1 of the present invention, for a power storage device cell or an electric storage device, The power storage device cell or the electric storage device is stored under the condition that the third electrode 7 is electrically connected with the terminal TP to which the first electrode 10a and the second electrode 10b, which are directly connected with each other, are connected; thus, not only deterioration can be prevented because the electrode potentials stabilize, but also the power storage device cell or the electric storage device can safely be stored because no electric leakage or electric shock may occur.

Embodiment 2

Figure 9:
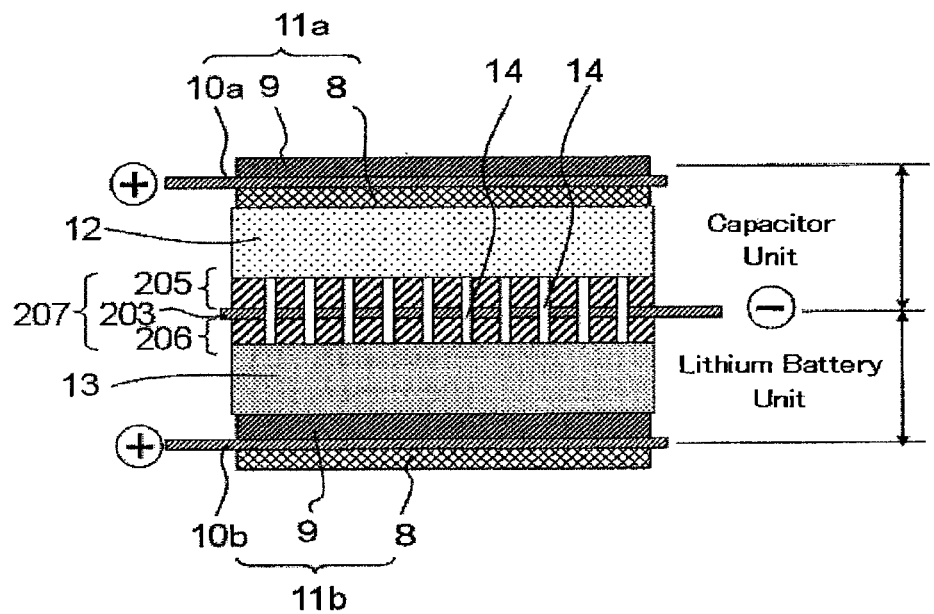
FIG. 9 is a partial cross-sectional view schematically illustrating a power storage device cell according to Embodiment 2 of the present invention.

FIG. 9 is a cross-sectional view schematically illustrating a power storage device cell according to Embodiment 2 of the present invention. The difference between Embodiment 1 and Embodiment 2 lies in that a penetration hole in the collector foil is formed by a through-hole that penetrates the common negative electrode. In FIG. 9, in a common negative electrode 207, as the material for a negative electrode collector foil 203, an aluminum foil was utilized which has no penetration hole formed therein and has a thickness of 10 μm through 20 μm; after a capacitor negative electrode layer 205 and a lithium battery negative electrode layer 206 were formed by coating both sides of the negative electrode collector foil 203 with a paste in which hard carbon particles and graphite particles are mixed, through-holes 14 were formed by making a tool, such as a "kenzan" (a tool that is utilized, in flower arrangement, for fixing flowers and twigs and in which a plurality of needles are arranged upward on a metal pedestal), that has pointed needle-shaped things arranged in the surface thereof physically penetrate the common negative electrode 207 so as to make holes therein. In other words, after an aluminum foil having no hole was coated with electrode layers, the through-holes 14 were formed by pressing protrusions against the metal foil, and then through-holes, among the through-holes 14, that are in the collector foil 203 were utilized as the penetration holes of the collector foil in Embodiment 1.

The great number of through-holes 14 that penetrate through the common negative electrode 207 in the thickness direction thereof can demonstrate an effect that the electrochemical potential of the common negative electrode 207 is kept constant and hence there can largely be reduced the risk that a local high potential or a local low potential erodes the capacitor positive electrode 11a or the lithium battery positive electrode 11b. Moreover, through the through-hole 14, the electrolyte solution and an ion can rapidly move between the separator 12 and the separator 13 that are situated on the upper side and the lower side, respectively, of the common negative electrode 207; therefore, there can be obtained an effect that in quick response to expansion/contraction of the electrode, the great number of through-holes 14 prevent deterioration caused by rapid charging and discharging. Because the no-hole metal foil can be coated with an electrode layer, the coating can readily be applied to the electrode layer, whereby a uniform electrode layer can be formed.

In FIG. 9, there has been illustrated a case where the electrode layers 205 and 206 are formed on both the corresponding sides of the negative electrode collector foil 203; however, the present invention is not limited thereto. For example, even in the case where only the electrode layer 205 or 206 is formed, the through-hole 14 can be formed after the electrode layer has been formed, whereby the electrolyte solution and an ion can rapidly move between the separator 12 and the separator 13 that are situated on the upper side and the lower side, respectively, of the of the common negative electrode 207.

As described above, the power storage device cell according to Embodiment 2 of the present invention is configured in such a way that in the common negative electrode 207, which is the third electrode, the through-hole 14 is provided which penetrates through the common negative electrode 207 in the thickness direction thereof; therefore, the electrolyte can smoothly move between the capacitor and the lithium battery, whereby the responsiveness to rapid charging and discharging is improved.

Moreover, in the manufacturing method for a power storage device cell according to Embodiment 2 of the present invention, the negative electrode collector foil 203 which is the third collector foil, is coated with a paste for forming the third electrode layers 205 and 206 before the penetration holes are formed in the negative electrode collector foil 203, and then the through-holes 14 are formed by pressing protrusions against the negative electrode collector foil 203; therefore, not only the penetration holes can be provided in the collector foil, but also the coating can satisfactorily be applied to the electrode layers, whereby the quality stabilizes.

Embodiment 3

Figure 10:
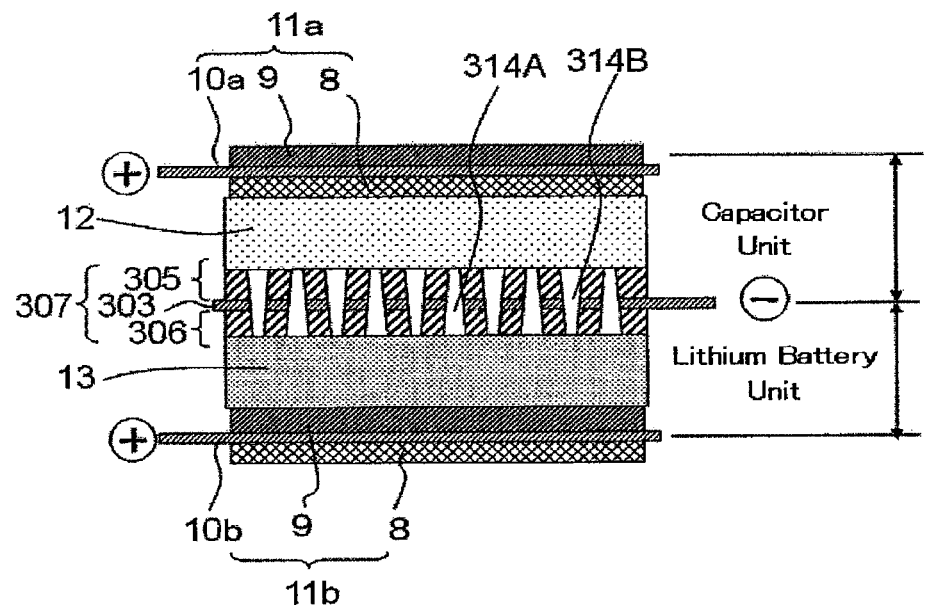
FIG. 10 is a partial cross-sectional view schematically illustrating a power storage device cell according to Embodiment 3 of the present invention.

FIG. 10 is a cross-sectional view schematically illustrating a power storage device cell according to Embodiment 3 of the present invention. As is the case with Embodiment 2, there are provided through-holes that penetrate through the common negative electrode; Embodiment 3 is different from Embodiment 2 in that a through-hole that penetrates through the common negative electrode is cone-shaped, and there are provided two kinds of through-holes (oriented to two directions), i.e., a through-hole 314A that becomes narrower in the direction toward the capacitor negative electrode layer and a through-hole 314B that becomes narrower in the direction toward the lithium battery negative electrode layer. Accordingly, the protrusions are pressed in two directions, i.e., from a capacitor negative electrode layer 305 and from a lithium battery negative electrode layer 306. Specifically, the through-holes of a common negative electrode 307 can be formed through a hole-making method in which a common negative electrode 307, the respective corresponding sides of which are coated with the electrode layers 305 and 306, is disposed between a metal die in which protrusions, each of which is in the form of a quadrangular pyramid, for example, having a base of 0.4 mm and a height of 0.7 mm, are formed in steps of 0.8 mm and a metal plate whose surfaces are smooth, and then pressing processing with a pressure of approximately 0.3 MPa is applied to the upper side and the lower side of the common negative electrode 307 individually. Similarly, a great number of holes can be made by making the upper and lower sides of the common negative electrode 307 pass through a roller having needles individually.

The electrolyte solution can readily pass through the quadrangular-pyramid through-holes 314A and 314B, which are formed from both sides of the common negative electrode 307, selectively in the directions in which the holes become narrower; because the through-hole 314B facilitates the transfer of the electrolyte solution from the first separator 12 to the second separator 13, and the through-hole 314A facilitates the transfer of the electrolyte solution from the second separator 13 to the first separator 12, the concentration of lithium ions becomes uniform; as a result, there can be demonstrated an effect that formation of lithium dendrites in the vicinity of the through-holes in the collector foil 303 is suppressed.

It is preferable that the opening area of the portion, of the collector foil 303, that corresponds to the penetration holes is 1% to 50% by area of the total area of the negative electrode collector foil 303; it is further preferable that the opening area is 5% to 20% by area. In the case where the opening area is from 1% to 50% by area, both the ion conductivity and the electric conductivity can be secured; furthermore, in the case where the opening area is from 5% to 20% by area, not only the balance between the ion conductivity and the electric conductivity becomes satisfactory, but also the strength of the collector foil can sufficiently be kept. Because by changing the opening area, the resistance against ion conduction through the through-holes 314A and 314B changes, the electrochemical-potential difference between the capacitor unit and the lithium battery unit can be controlled; the smaller the opening area is, the larger the electrochemical-potential difference becomes, and hence the electrochemical potential of the lithium battery unit changes slowly.

As described above, a power storage device cell according to Embodiment 3 of the present invention is configured in such a way that the third electrode layers 305 and 306 are provided on both corresponding sides of the third collector foil 303 and that as the through-holes, there are provided two types of through-holes, i.e., the first through-hole 314B, which becomes narrower in the direction from the one side on which the electrode layer 305 of the third electrode 307 is provided to the other side thereof on which the electrode layer 306 is provided, and the second through-hole 314A, which, contrary to the first through-hole 314B, becomes narrower in the direction from the other side on which the electrode layer 306 of the third electrode 307 is provided to the one side thereof on which the electrode layer 305 is provided; therefore, the electrolyte can smoothly move interactive as to move from the capacitor to the lithium battery and move from the lithium battery to the capacitor, whereby the responsiveness to rapid charging and discharging is improved.

Moreover, in the manufacturing method for a power storage device cell according to Embodiment 3 of the present invention, the through-holes 314A and 314B are formed in such a way that both sides of a metal foil are coated with a paste for forming the electrode layers 305 and 306, and then protrusions are pressed against both the respective sides; therefore, the coating can satisfactorily be applied to the electrode layers, where by the quality stabilizes.

In each of Embodiments 2 and 3, the hole, which is formed in the collector foil when a through-hole is made, is adopted as a penetration hole for the electrolyte; however, it goes without saying that even in the case where penetration holes are formed in addition to through-holes, there can be demonstrated an effect that the through-holes make the electrolyte move smoothly.

Embodiment 4

Figure 11:
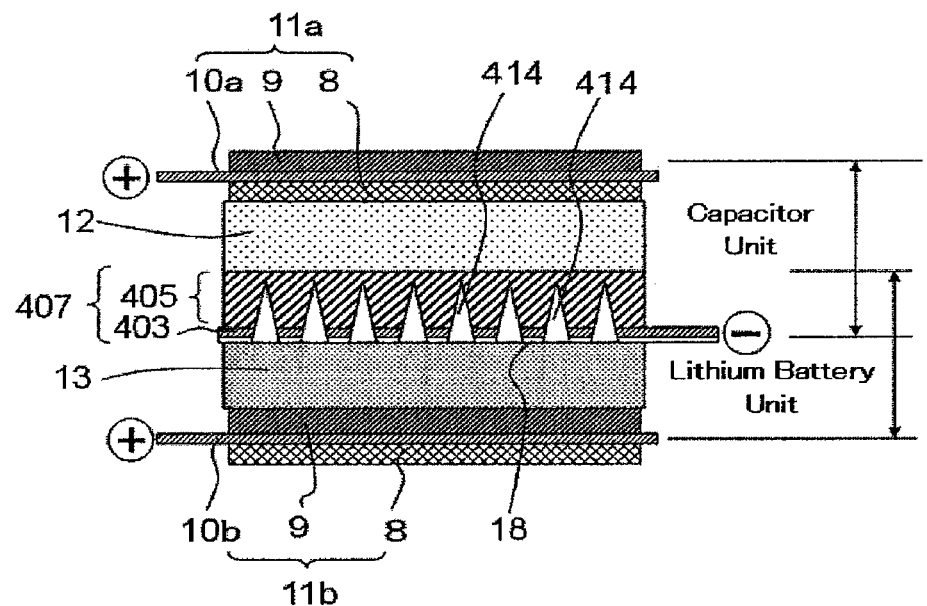
FIG. 11 is a partial cross-sectional view schematically illustrating a power storage device cell according to Embodiment 4 of the present invention.

FIG. 11 is a cross-sectional view schematically illustrating a power storage device cell according to Embodiment 4 of the present invention. Embodiment 4 differs from Embodiment 1 in that in a common negative electrode 407, a capacitor negative electrode layer 405 is formed on one side of a collector foil 403 and an electric insulative layer 18 is formed on the other side, of the collector foil 403, that is situated at the lithium battery unit side. As the electric insulative layer 18, a layer is desirable which is coated with a film such as a polyethylene film or a polypropylene film or PVDF. The capacitor negative electrode layer 405 functions also as a lithium battery negative electrode layer 406. A pointed through-hole 414 that penetrates through the common negative electrode 407 including the electric insulative layer 18 is formed in such a way as to start from the electric insulative layer 18 side and becomes narrower in the direction from the electric insulative layer 18 to the capacitor negative electrode layer 405. By making the common negative electrode 407 pass through a roller having needles in such a way that the electric insulative layer 18 faces the needles, a great number of through-holes 414 can be made. It is desirable that the aperture ratio of holes is 30% to 70%; when the aperture ratio of holes is smaller than 30%, the function, as the lithium battery negative electrode layer 506, of the capacitor negative electrode layer 505 is deteriorated. In contrast, when the aperture ratio of holes is larger than 70%, the performance may be deteriorated by the decrease in the area of the negative electrode layer.

Also in the case where the capacitor negative electrode layer 405 functions as a lithium battery negative electrode layer 406, it is important that the lithium battery positive electrode layer 9 is formed of a material including particles of olivine-type lithium iron phosphate, the electrode layer of the common negative electrode 407 is formed mainly of particles of lithium titanate, and the common negative electrode collector foil 403 is formed of an aluminum foil; deterioration can be prevented by lowering the inter-terminal voltage at a time when the state of charge is 0%. Moreover, because the electric insulative layer 18 is provided on the side, of the negative electrode collector foil 403, on which no electrode layer is provided, the portion, out of the aluminum metal portion of the collector foil, that does not contribute to the reaction does not make contact with the electrolyte solution; thus, the elution (erosion) of the collector foil can be suppressed.

As described above, a power storage device cell according to Embodiment 4 of the present invention is configured in such a way that in the common negative electrode 407, the electrode layer 405 is formed on one side, of the collector foil 403, that faces the capacitor positive electrode layer 8 through the separator 12, the insulative layer 18 is formed on the other side, of the collector foil 403, that faces the electrode layer 9 through the separator 13, and through-holes 414 are provided that become narrower in the direction from the insulative layer 18 to the electrode layer 405 and penetrate the common negative electrode 407 in the thickness direction thereof. As a result, the portion, out of the aluminum metal portion of the collector foil, that does not contribute to the reaction does not make contact with the electrolyte solution; thus, the elution (erosion) from the collector foil can be suppressed.

Embodiment 5

Figure 12:
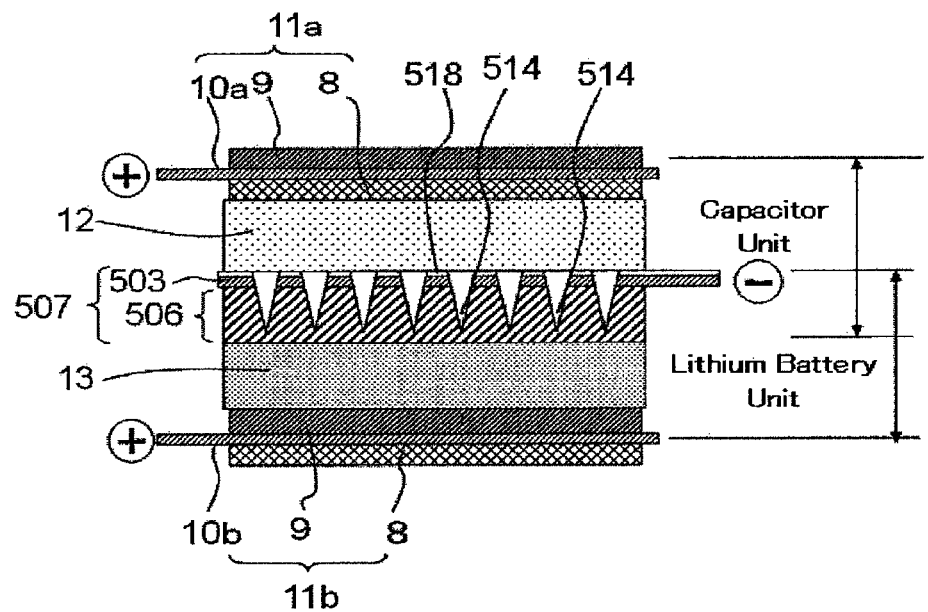
FIG. 12 is a partial cross-sectional view schematically illustrating a power storage device cell according to Embodiment 5 of the present invention.

FIG. 12 is a cross-sectional view schematically illustrating a power storage device cell according to Embodiment 5 of the present invention. Embodiment 5 differs from Embodiment 1 in that in a common negative electrode 507, a lithium battery negative electrode layer 506 is formed on one side of a collector foil 503 and an electric insulative layer 518 is formed on the other side, of the collector foil 503, that is situated at the capacitor unit side. The structure, in the thickness direction, of the common negative electrode 507 is exactly contrary to that of the common negative electrode 407 of Embodiment 4. The lithium battery negative electrode layer 506 functions also as a capacitor negative electrode layer 505.

A pointed through-hole 514 that penetrates through the common negative electrode 507 is formed in such a way as to start from the electric insulative layer 518 side and becomes narrower in the direction from the electric insulative layer 518 to the lithium negative electrode layer 506. By making the common negative electrode 507 pass through a roller having needles in such a way that the electric insulative layer 518 faces the needles, a great number of through-holes 514 can be made. It is desirable that the aperture ratio of holes is 30% to 70%; when the aperture ratio of holes is smaller than 30%, the function, as the lithium battery negative electrode layer 506, of the capacitor negative electrode layer 505 is deteriorated. In contrast, when the aperture ratio of holes is larger than 70%, the performance may be deteriorated by the decrease in the area of the negative electrode layer.

Also in the case where the lithium battery negative electrode layer 506 functions as the capacitor negative electrode layer 505, it is important that the lithium battery positive electrode layer 9 is formed of a material including particles of olivine-type lithium iron phosphate, the electrode layer of the common negative electrode 507 is formed mainly of particles of lithium titanate, and the common negative electrode collector foil 503 is formed of an aluminum foil; deterioration can be prevented by lowering the inter-terminal voltage at a time when the state of charge is 0%. Moreover, because also in Embodiment 5, the electric insulative layer 518 is provided on the side, of the negative electrode collector foil 503, on which no electrode layer is provided, the portion, out of the metal portion of the aluminum collector foil, that does not contribute to the reaction does not make contact with the electrolyte solution; thus, the elution (erosion) of the collector foil can be suppressed.

As described above, a power storage device cell according to Embodiment 5 of the present invention is configured in such a way that in the common negative electrode 507, the electrode layer 506 is formed on one side, of the collector foil 503, that faces the electrode layer 9 through the separator 13, the insulative layer 518 is formed on the other side, of the collector foil 503, that faces the capacitor positive electrode layer 8 through the separator 12, and through-holes 514 are provided that become narrower in the direction from the insulative layer 518 to the electrode layer 506 and penetrate the common negative electrode 507 in the thickness direction thereof. As a result, the portion, out of the aluminum metal portion of the collector foil, that does not contribute to the reaction does not make contact with the electrolyte solution; thus, the elution (erosion) from the collector foil can be suppressed.

Embodiment 6

Figure 13:
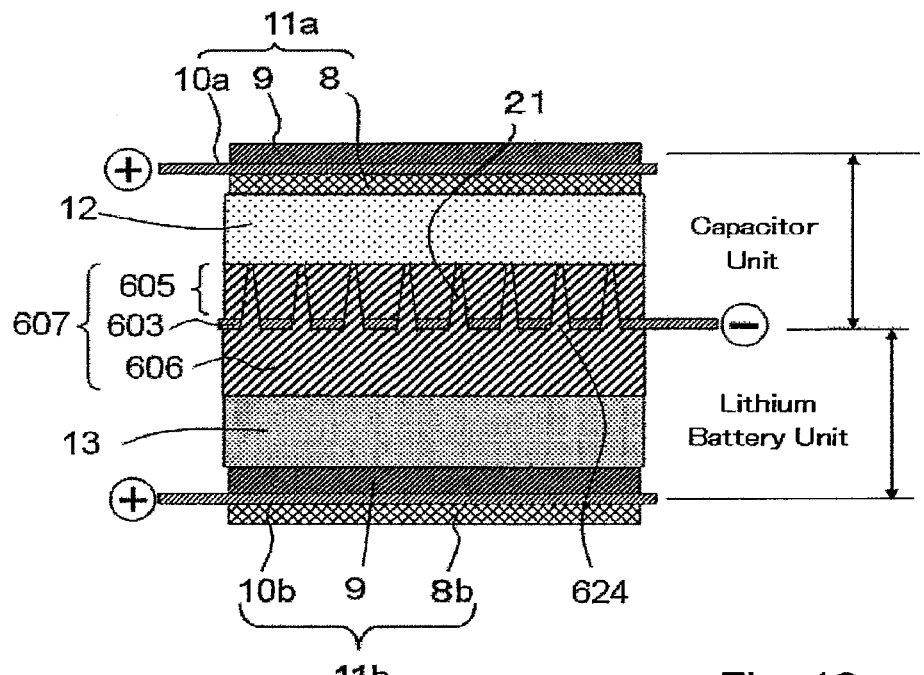
FIG. 13 is a partial cross-sectional view schematically illustrating a power storage device cell according to Embodiment 6 of the present invention.
Figure 14:
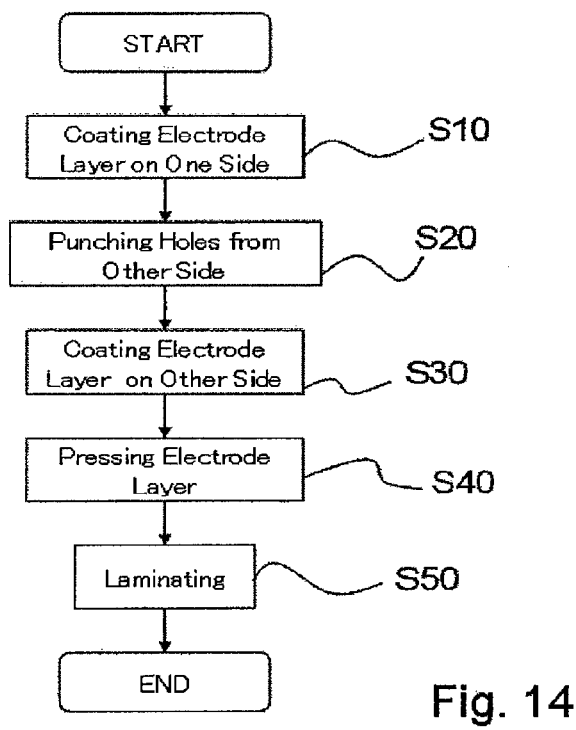
FIG. 14 is a flowchart for explaining a manufacturing method of a power storage device cell according to Embodiment 6 of the present invention.

In Embodiment 6, in a power storage device cell in which respective electrode layers are provided on both the sides of a common negative electrode, there are provided, in at least one of both the electrode layers provided on both the sides of the common negative electrode, a plurality of digging portions that dig into the other one of both the electrode layers through penetration holes. The detail will be explained below. FIG. 13 is a cross-sectional view schematically illustrating a power storage device cell according to Embodiment 6; FIG. 14 is a flowchart for explaining a manufacturing method for the power storage device cell. In FIG. 13, in an electrode layer 606 out of a collector foil 603, an electrode layer 605, and the electrode layer 606 that are included in a common negative electrode 607, there are provided a plurality of digging portions 21 that dig into the electrode layer 605 through through-holes 624, which serve as penetration holes in the collector foil 603. The other configurations are the same as those of the power storage device explained in Embodiment 1.

As illustrated in FIG. 14, when the common negative electrode 607 is manufactured, after the negative electrode layer 605 is formed by coating one side of the collector foil 603 with a paste made of particles that are included in the electrode layer (the step S10), there are punched out reaching holes 624 that reach at least the inside of the electrode layer 605 from the other side of the collector foil 603 and function as penetration holes (the step S20). Then, by coating the punching side of the collector foil 603 with a paste of particles that are included in the electrode layer, the negative electrode layer 606 is formed (the step S30), so that the electrode layer 606 have a plurality of digging portions 21 that dig into the inside of the electrode layer 605. The digging portion 21 functionally serves as the electrode layer 605. After the step S30, the electrodes are pressed so that the electrode density is adjusted (the step S40). Then, by laminating the electrodes (the step S50), a power storage device cell is manufactured.

Through this manufacturing method, the insides of the reaching holes 624 punched during the manufacturing process are filled with the respective digging portions 21 that are formed in such a way as to be integrated with the main body of the electrode layer 606; thus, the adhesiveness among the collector foil 603 and the electrode layer 605 and the electrode layer 606 are raised. The reaching hole 624 formed by punching may penetrate through to the surface of the electrode (electrode layer 605 ) or may stop halfway through the electrode layer 605. In sum, it is only necessary that there provided a hole, on the collector foil 603, which reaches the inside the electrode layer 605 and through which lithium can pass. In FIG. 13, in the case where the reaching holes 624 are formed in such a way as to penetrate through the surface of the electrode, the penetration causes depressions and protrusions on the surface of the electrode; it is desirable to flatten these depressions and protrusions by use of a press. In FIG. 14, it may be allowed that after punching (the step S20) is implemented, pressing process (the step S40) is implemented. After that, as is the case with each of the foregoing embodiments, the separators, the capacitor positive electrode, and the lithium positive electrode (or the hybrid positive electrode) are sequentially laminated, so that a power storage device cell can be manufactured.

In FIG. 14, in the case where the step S20 is omitted, the flow corresponds to the manufacturing method according to Embodiment 1; in the case where the step S20 is set after the step S30, the flow corresponds to the manufacturing method according to each of Embodiments 2 and 3.

Embodiment 7

Figure 15:
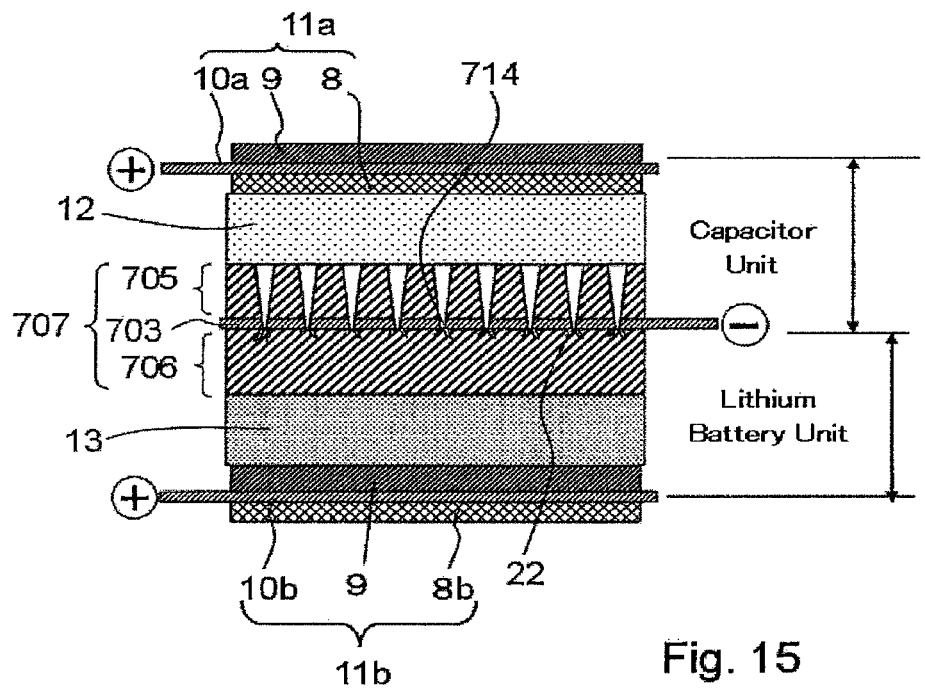
FIG. 15 is a partial cross-sectional view schematically illustrating a power storage device cell according to Embodiment 7 of the present invention.
Figure 16:
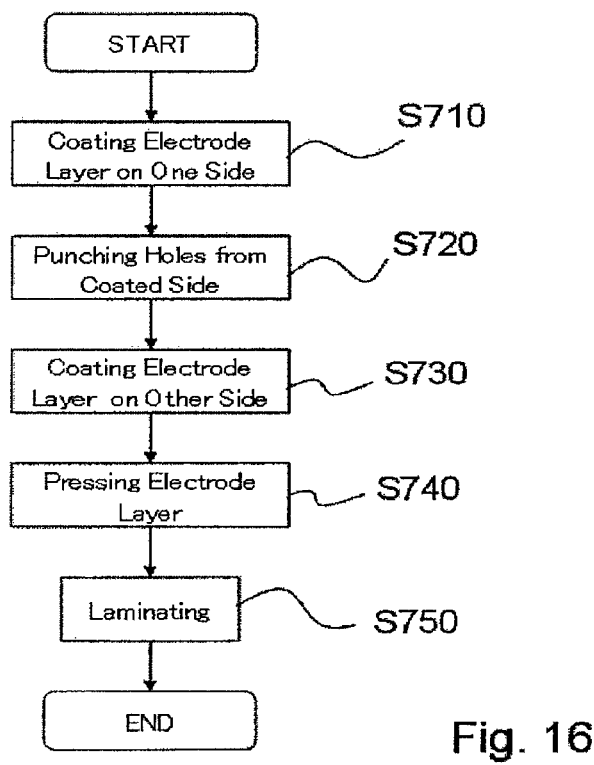
FIG. 16 is a flowchart for explaining a manufacturing method of a power storage device cell according to Embodiment 7 of the present invention.

In Embodiment 7, in the common negative electrode collector foil, there are formed burrs that latch onto an electrode layer provided on at least one side of the common negative electrode, from the peripheries of penetration holes. The detail will be explained below. FIG. 15 is a cross-sectional view schematically illustrating a power storage device cell according to Embodiment 7; FIG. 16 is a flowchart for explaining a manufacturing method for the power storage device cell. In FIG. 15, in a collector foil 703 included in a common negative electrode 707, there are formed burrs 22 that latch onto an electrode layer 106 from the peripheries of through-holes 714. The other configurations are the same as those of the power storage device explained in Embodiment 1 or Embodiment 2.

As illustrated in FIG. 16, when the common negative electrode 707 is manufactured, after a negative electrode layer 705 is formed by coating one side of the collector foil 703 with a paste made of particles that are included in the electrode layer (the step S710), protrusions are pressed against the negative electrode layer 705 from the coated side thereof so that there are formed the through-holes 714 that penetrate at least the collector foil 703 and function as penetration holes (the step S720). Then, the collector foil 703 is coated with the paste made of particles that are included in the electrode layer, from the other side, of the collector foil 703, on which no electrode layer has been coated, so that a negative electrode layer 706 is formed (the step S730). As a result, in the collector foil 703, there are formed burrs 22 that latch onto the electrode layer 706 from the peripheries of the through-holes 714; the electrode layer 706 is formed in such a way as to surround the burrs 22. After that, the common negative electrode 707 is pressed so that the electrode density is adjusted (the step S740); then, lamination is implemented (the step S750) so that a power storage device cell is manufactured.

In this manufacturing method, a soft base material such as rubber is placed under the collector foil 703 when punching is performed; thus, when the protrusion breaks through the collector foil 703, the burr 22 protrudes into the electrode layer 706; then, the front end thereof spreads in such a way as to open from the center of the hole, so that the burr is formed inside out on the electrode layer 706. Accordingly, when being coated, the electrode layer 706 is formed in such a way as to surround the burrs 22; therefore, the strength of adhesion between the negative electrode layer 706 and the negative electrode collector foil 703 is raised. After that, as is the case with each of the foregoing embodiments, the separators, the capacitor positive electrode, and the lithium positive electrode (or the hybrid positive electrode) are sequentially laminated, so that a power storage device cell can be manufactured.

In Embodiment 7, there have been explained the configuration and the manufacturing method in the case where respective electrode layers are provided on both sides of a collector foil; however, it is not necessarily required to form the electrode layers on both sides of the collector foil. For example, the electrode may be formed in such a way that after a collector foil on which no electrode layer has been formed is punched so that burrs are formed, the side on which the burrs are formed is coated with an electrode layer. Therefore, punching may be implemented in such a way that the punching directions are changed for the purpose of forming burrs on both sides of the collector foil.

Next, in order to verify the performance of a power storage device cell according to each of Embodiments 6 and 7 of the present invention, prototype cells having different structures of the common negative electrode were manufactured and performance tests were carried out. Also in the foregoing performance tests, in order to simplify the test condition, as is the case with Embodiment 1, a positive electrode dedicated to the lithium battery positive electrode and a positive electrode dedicated to the capacitor positive electrode were utilized instead of a hybrid electrode.

EXAMPLE 3

[Manufacturing of Common Negative Electrode]

Particles of lithium titanate according to the general formula $Li_xTi_5O_{12}$ (x=4.0), acetylene black, as a conductive assistant, and polyvinylidene fluoride (PVDF), as a binder, were mixed at the weight ratio of 87:5:8, so that an electrode paste including n-methylpyrrolidone, as a solvent, was mixture-prepared. Next, both sides of a plane aluminum foil, as the negative electrode collector foil, having a width of 300 mm and a thickness of 20 μm were coated with this paste and then pressed by use of a hot roll press at 110° C. This electrode was placed between a metal plate having smooth surfaces and a plane metal die in which quadrangular-pyramid protrusions each having a bottom side of 0.4 mm and a height of 0.7 mm were formed in steps of 0.8 mm; then, the operation of putting an acryl plate thereon and pressing it with the pressure of 0.5 MPa was repeated twice, so that it was adopted as the common negative electrode. The negative electrode was cut into a strip of 32 mm by 52 mm; a portion of 20 mm by 20 mm was cut out from the corner thereof; then, a tab of 7 mm by 20 mm was provided so as to be utilized as a current terminal tab.

[Manufacturing of Capacitor Positive Electrode]

A capacitor positive electrode was manufactured in the same manner as Example 1 explained in Embodiment 1.

[Manufacturing of Lithium Battery Positive Electrode]

A lithium battery positive electrode was manufactured in the same manner as Example 1 explained in Embodiment 1.

[Manufacturing of Cell]

A cell was manufactured in the same manner as Example 1 explained in Embodiment 1.

EXAMPLE 4

Corresponding to Embodiment 6

[Manufacturing of Common Negative Electrode]

Particles of lithium titanate according to the general formula $Li_xTi_5O_{12}$ (x=4.0), acetylene black, as a conductive assistant, and polyvinylidene fluoride (PVDF), as a binder, were mixed at the weight ratio of 87:5:8, so that an electrode paste including n-methylpyrrolidone, as a solvent, was mixture-prepared. Next, after one side of a plane aluminum foil, as the negative electrode collector foil, having a width of 300 mm and a thickness of 20 μm was coated with this paste and then dried, this electrode is placed between a metal plate having smooth surfaces and a plane metal die in which there are formed quadrangular-pyramid protrusions each having a bottom side of 0.4 mm and a height of 0.7 mm are formed in steps of 0.8 mm; then, the operation of putting an acryl plate thereon and pressing it with the pressure of 0.5 MPa so as to punch reaching holes that reach from the collector foil to the inside of the electrode layer was repeated twice. After that, the collector foil was coated with the foregoing paste, and then the other electrode layer was formed in such a way as to fill up the reaching holes, so that a negative electrode was formed that has respective electrode layers on both sides thereof. This electrode was pressed by use of a hot roll press at the temperature of 110° C.; then, it was adopted as the common negative electrode.

In addition, [Manufacturing of Capacitor Positive Electrode], [Manufacturing of Lithium Battery Positive Electrode], and [Manufacturing of Cell] were implemented in the same manner as Example 1 explained in Embodiment 1.

EXAMPLE 5

Corresponding to Embodiment 7

Particles of lithium titanate according to the general formula $Li_xTi_5O_{12}$ (x=4.0), acetylene black, as a conductive assistant, and polyvinylidene fluoride (PVDF), as a binder, were mixed at the weight ratio of 87:5:8, so that an electrode paste including n-methylpyrrolidone, as a solvent, was mixture-prepared. Next, after one side of a plane aluminum foil, as the negative electrode collector foil, having a width of 300 mm and a thickness of 20 μm was coated with this paste and then dried, this electrode is placed between a metal plate having smooth surfaces and a plane metal die in which there are formed quadrangular-pyramid protrusions each having a bottom side of 0.4 mm and a height of 0.7 mm are formed in steps of 0.8 mm; then, the operation of putting an acryl plate thereon and pressing it with the pressure of 0.5 MPa so as to punch holes from the electrode layer side was repeated twice. The collector foil was broken through by the punching and burrs of 90 μm were formed in the peripheries of the holes. After that, the collector foil was coated with the foregoing paste, and then an electrode layer was formed in such a way as to surround the burrs, so that a negative electrode was formed that has respective electrode layers on both sides thereof. This electrode was pressed by use of a hot roll press at the temperature of 110° C.; then, it was adopted as the common negative electrode.

In addition, [Manufacturing of Capacitor Positive Electrode], [Manufacturing of Lithium Battery Positive Electrode], and [Manufacturing of Cell] were implemented in the same manner as Example 1 explained in Embodiment 1.

[Evaluation of Electrode]

A piece of 14 mm by 14 mm was cut out from each of common negative electrodes of Examples 3 through 5 and flanked with aluminum foils of 10 mm by 10 mm; then, the resistance of the electrode was measured while the piece of common negative electrode flanked with the aluminum foils was pressed at the pressure of 10 kg/cm². The electric resistivity of each electrode is represented in Table 2.

TABLE 2

| | Structure | Electric Resistivity of Electrode (Ωcm) |
|---|---|---|
| Example 1 | Electrode Layers on Both Sides | 12.8 |
| Example 3 | Punching Holes after Forming Electrode Layer | 12.1 |
| Example 4 | Digging Portions Digging into Other Electrode Layer | 8.5 |
| Example 5 | Burrs Latching onto Electrode Layer | 9.2 |

As represented in Table 2, each Example has a common negative electrode in which respective electrode layers are formed on both sides of a collector foil. However, while the electric resistivity of the electrode of each of Examples 1 and 3, in which the collector foil separates the respective electrode layers on both sides thereof, is 12 Ω/cm or higher, the electrode of Examples 4, in which the one electrode layer 606 digs into the other electrode layer 605, has a low electric resistivity of 8.5 Ωcm. The reason why the electric resistivities are as represented in Table 2 may be that because the power storage device cell is formed in such a way that in the common negative electrode, the electrode layer 606, which is formed after the electrode layer 605 has been formed, fills up the reaching holes 624 that reach the electrode layer 605, which is formed before the electrode layer 606 is formed, the electrode layers 605 and 606 are each situated in such a way as to depress the collector foil 603 and hence the adhesiveness among the collector foil 603 and the electrode layer 605 and the electrode layer 606 is raised.

Comparing the electric resistivity of the electrode of each of Examples 1 and 3 with the electric resistivity of the electrode of Example 5 in which burrs of the collector foil 703 latch onto the electrode layer 706, it is learned that the electric resistivity of the electrode of Example 5 is 9.2 Ωcm, i.e., lower than that of the electrode of each of Examples 1 and 3. The reason for that may be that because in the manufacturing process for the common negative electrode, the electrode layer 706 is formed in such a way as to surround the burrs 22 that are formed when the through-hole 714 that penetrates the collector foil 703 is formed, the adhesiveness of the collector foil 703 to the electrode layer 706 is raised.

[Evaluation of Cell]

While by use of a stainless-steel retaining plate, a contact pressure of 5 Kg/cm² was applied to the electrode of 3 cm by 3 cm in the cell of each of Examples 3 through 5, a charging/discharging test was implemented in which 20-minute charging and 20-minute discharging (3C) were alternatively repeated for 48 hours under the conditions of the ambient temperature of 5° C., the lower limit voltage of 0 V, and the upper limit voltage of 4.0 V. Before and after the test, charging and discharging were repeated three times, and then the electrostatic capacitance was determined from the discharging curve of the third charging and discharging. Defining the initial electrostatic capacitance as 100%, the post-testing electrostatic capacitance maintenance rate was determined. Table 3 represents the results of the foregoing evaluations and the result (Table 1) for Example 1 according to Embodiment 1.

TABLE 3

| | Electrostatic Capacitance Maintenance Rate (%) |
|---|---|
| Example 1 | 90 |
| Example 3 | 95 |
| Example 4 | 98 |
| Example 5 | 98 |

The electrostatic capacitance maintenance rate of the cell of each of Examples 3 through 5, which have a punching process at least during the process, is higher than the electrostatic capacitance maintenance rate of the cell of Example 1, in which the respective electrode layers are simply formed on both sides of the collector foil. The reason for that may be that because for the purpose of flattening depressions and protrusions formed by the punching process, a pressing process is implemented, the thickness variation in the electrode layers decreases and hence the flatness is raised. Furthermore, the electrostatic capacitance maintenance rate of the cell of Example 4, in which one electrode layer digs into the other electrode layer, and the electrostatic capacitance maintenance rate of the cell of Example 5, in which burrs in the collector foil latch onto one electrode layer, are further raised in comparison with the cell of Example 3, in which the collector foil separates the respective electrode layers on both sides thereof.

The cells of Examples 1 and 3 through 5 were further stored at a room temperature for one month under the condition that the positive electrode and the negative electrode thereof were electrically connected with each other by use of a clip; then, after charging and discharging were implemented three times, the electrostatic capacitance was examined. As a result, because the electrostatic capacitance maintenance rate had been kept at a high value of 92% and the internal resistance had not become high, it was clear that the cell can be stored under that condition that the positive electrode and the negative electrode thereof are electrically connected with each other.

As described above, in the power storage device according to Embodiment 6, the common negative electrode 607 is configured in such a way that, the respective electrode layers 605 and 606 are provided on both sides of the collector foil 603, and there are provided, in at least one electrode layer 606 of both the electrode layers 605 and 606 provided on both sides of the collector foil 603, a plurality of digging portions 21 that dig into the other electrode layer 605 through penetration holes 624; thus, the adhesiveness of the collector foil 603 to the electrode layers 605 and 606 is raised, whereby a high-reliability power storage device cell can be obtained.

In the power storage device manufacturing method according to Embodiment 6, in the process of forming the common negative electrode 607, one side of the collector foil 603 is coated with a paste obtained by adding a conductive assistant and a binder to particles of lithium titanate (the step S10); after that, by pressing protrusions against the collector foil 603 from the other side thereof, there are punched the reaching holes 624 that reach at least the inside of the one electrode layer 605 and function as penetration holes (the step S20); the collector foil 603 is coated with a paste obtained by adding a conductive assistant and a binder to particles of lithium titanate from the side from which the protrusions have been pressed against the collector foil 603, in such a way that the reaching holes 624 are filled up (the step S30), so that the other electrode layer 606 is formed; then, a power storage device cell is manufactured by laminating the electrode 11a, the separator 12, the common negative electrode 607, the separator 13, and the electrode 11b in that order (the step S40). As a result, the foregoing power storage device can readily be produced.

As described above, the power storage device according to Embodiment 7 is configured in such a way that in the collector foil 703 of the common negative electrode 707, there are formed burrs 22 that latch onto the electrode layer 706 provided at least one side of the common negative electrode 707, from the peripheries of penetration holes 714; therefore, the adhesiveness of the collector foil 703 to the electrode layers 706 is raised, whereby a high-reliability power storage device cell can be obtained.

In the power storage device manufacturing method according to Embodiment 7, in the process of forming the common negative electrode 707, protrusions are pressed against the collector foil 703 from the one side that is opposite to the other side on which no electrode layer has been formed, so that there are formed the through-holes 714 that penetrate at least the collector foil 703 and function as penetration holes; the side, of the collector foil 703, in which the burrs 22 have been formed with formation of the through-holes 714, is coated with a paste, so that the electrode layer 706 is formed; then, a power storage device cell is manufactured by laminating the electrode 11a, the separator 12, the common negative electrode 607, the separator 13, and the electrode 11b in that order (the step S40). As a result, the foregoing power storage device can readily be manufactured.

DESCRIPTION OF REFERENCE NUMERALS

3: negative electrode collector foil (third collector foil)
4: penetration hole in negative electrode collector foil
5: capacitor negative electrode layer (third electrode layer)
6: lithium battery negative electrode layer (third electrode layer)
7: common negative electrode (third electrode)
8: capacitor positive electrode layer (first electrode layer)
9: lithium battery positive electrode layer (first electrode layer)
10: positive electrode collector foil (10a: first collector foil, 10b: second collector foil)
11: positive electrode
11a: hybrid positive electrode (dealt with as capacitor positive electrode)
11b: hybrid positive electrode (dealt with as lithium battery positive electrode)
11C: capacitor positive electrode
11L: lithium battery positive electrode
12: first separator
13: second separator
14: through-hole in common negative electrode
18: electric insulative layer
19: case
20: heat-fused portion
21: digging portion
22: burr Three-digit numbers each denote variant examples in Embodiments.

The invention claimed is:

1. A storing method of using a power storage device cell including
a first electrode in which a first electrode layer including activated-carbon fine particles is formed on one side of a first collector foil made of aluminum,
a second electrode in which a second electrode layer is formed on one side of a second collector foil made of aluminum,
a third electrode in which third electrode layer is formed on at least one side of a third collector foil made of aluminum,
a first separator formed of a porous insulative film, and
a second separator formed of a porous insulative film, wherein penetration holes are formed in the third collector foil, a capacitor whose negative electrode is the third electrode is formed by inserting the first separator between the first electrode layer and one side of the third electrode, a lithium ion battery whose negative electrode common to the capacitor is the third electrode is formed by inserting the second separator between the second electrode layer and the other side of the third electrode, and the first electrode and the second electrode are directly connected with each other, and
wherein the second electrode layer is formed of a material including particles of phosphoric-acid-type lithium compound having an olivine-type structure, and the third electrode layer is formed mainly of particles of lithium titanate; and the composition of the lithium titanate conforms to a general formula $Li_xTi_5O_{12}$ ($4.0 \leq x \leq 4.1$) when the state of charge of the power storage device cell is 0%, the method comprising:
storing the power storage device cell under a condition of electrically directly connecting the third electrode with a terminal to which the first electrode and the second electrode, which are directly connected with each other, are directly connected.

* * * * *